United States Patent [19]
Sakaida et al.

[11] Patent Number: 4,979,275
[45] Date of Patent: Dec. 25, 1990

[54] DEVICE FOR MAGNIFYING DISPLACEMENT OF PIEZOELECTRIC ELEMENT OR THE LIKE AND METHOD FOR PRODUCING SAME

[75] Inventors: Atsuo Sakaida, Gifu; Yoshiyuki Ikezaki; Akira Iriguchi, both of Nagoya; Yasuji Chikaoka, Aichi; Yasuo Imoto, Nagoya, all of Japan

[73] Assignee: Brother Kogyo Kabushiki Kaisha, Aichi, Japan

[21] Appl. No.: 397,751

[22] Filed: Aug. 23, 1989

Related U.S. Application Data

[63] Continuation-in-part of Ser. No. 202,035, Jun. 3, 1988, Pat. No. 4,874,978, and a continuation-in-part of Ser. No. 375,403, Jul. 3, 1989.

[30] Foreign Application Priority Data

| Jun. 9, 1987 | [JP] | Japan | 62-143530 |
| Jun. 12, 1987 | [JP] | Japan | 62-90834 |
| Jun. 16, 1987 | [JP] | Japan | 62-149535 |
| Oct. 30, 1987 | [JP] | Japan | 62-277169 |
| Jan. 23, 1988 | [JP] | Japan | 63-13229 |
| Jan. 25, 1988 | [JP] | Japan | 63-14019 |
| Jan. 29, 1988 | [JP] | Japan | 63-19844 |
| Feb. 2, 1988 | [JP] | Japan | 63-23561 |
| Jul. 21, 1988 | [JP] | Japan | 63-182063 |
| Jul. 29, 1988 | [JP] | Japan | 63-191127 |
| Aug. 19, 1988 | [JP] | Japan | 63-206539 |
| Aug. 23, 1988 | [JP] | Japan | 63-209173 |
| Oct. 20, 1988 | [JP] | Japan | 63-264979 |

[51] Int. Cl.$^5$ .......................................... H01L 41/22
[52] U.S. Cl. .................................. 29/25.35; 29/416; 29/418; 310/328
[58] Field of Search .................. 29/418, 416, 25.35; 400/124; 310/328

[56] References Cited

U.S. PATENT DOCUMENTS

| 3,460,244 | 8/1969 | Metz | 29/603 |
| 3,524,196 | 8/1970 | Church et al. | |
| 3,614,486 | 10/1971 | Smiley | |
| 3,624,896 | 12/1971 | Danbeney et al. | 29/416 X |
| 3,649,857 | 3/1972 | Knappe | |
| 3,955,049 | 5/1976 | MacNeil et al. | |
| 4,435,666 | 3/1984 | Fukui et al. | |
| 4,518,887 | 5/1985 | Yano et al. | |
| 4,547,086 | 10/1985 | Matsumoto et al. | |
| 4,570,095 | 2/1986 | Uchikawa | |
| 4,589,786 | 5/1986 | Fukui et al. | |
| 4,672,257 | 6/1987 | Oota et al. | |
| 4,675,568 | 6/1987 | Uchikawa et al. | |

FOREIGN PATENT DOCUMENTS 187980 11/1982 Japan .

Primary Examiner—Carl E. Hall
Attorney, Agent, or Firm—Oliff & Berridge

[57] ABSTRACT

A method of producing a device for magnifying displacement of a piezoelectric element adapted to be displaced by application of voltage thereto. The method includes a first step of forming a movable member integrally with a frame through a connecting portion in such a manner as a space for inserting therein a piezoelectric element is defined between the movable member and a base portion of the frame; a second step of fixing the leaf spring to the frame and the movable member; and a third step of forming a separation groove in the connecting portion to separate the movable member from the frame.

17 Claims, 33 Drawing Sheets

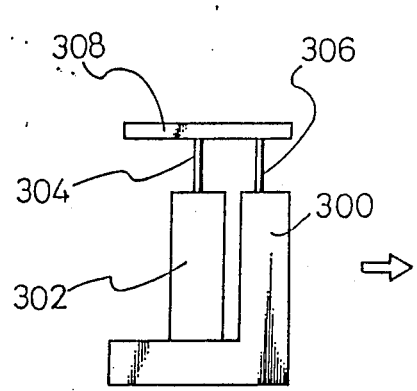
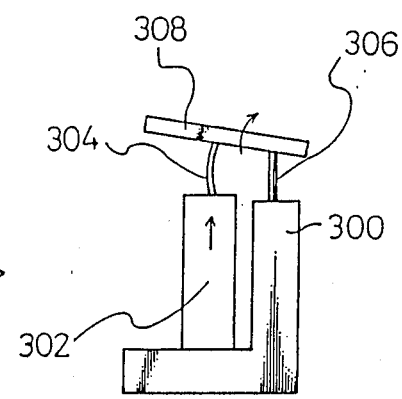
FIG.39(A) PRIOR ART
FIG.39(B) PRIOR ART

DEVICE FOR MAGNIFYING DISPLACEMENT OF PIEZOELECTRIC ELEMENT OR THE LIKE AND METHOD FOR PRODUCING SAME

This is a continuation-in-part of applications Ser. No. 07/202,035, filed June 3, 1988 now U.S. Pat. No. 4,874,978, and Ser. No. 07/375,403, filed July 3, 1989.

BACKGROUND OF THE INVENTION

The present invention relates to an actuator art for driving a printing wire or the like in a printing head, for example, and more particularly to a device for magnifying displacement of a piezoelectric element or the like as a driving source wherein expansion and contraction of the piezoelectric element is magnified through a rolling motion of a rolling member into a relatively large movement of the printing wire to carry out a printing operation of the printing wire. The present invention also relates to a method of producing such a device as mentioned above.

There are various known devices as mentioned above. For example, there is disclosed in Japanese Patent Laid-open Publication No. 57-187980 a device for magnifying displacement of a piezoelectric element as shown in FIGS. 39(A) and 39(B). Referring to FIGS. 39(A) and 39(B) which show a rest condition and an operative condition of the device, respectively, a piezoelectric element 302 is fixed to a frame 300, and a rolling member 308 is connected through a pair of leaf springs 304 and 306 spaced a given distance from each other to the piezoelectric element 302 and the frame 300. As shown in FIG. 39(B), when the piezoelectric element 302 is expanded, the rolling member 308 is rolled about a connecting portion between the same and the leaf spring 306 by the moment generated at a connecting portion of the rolling member 308 and the leaf spring 304. Thus, the displacement of the piezoelectric element 302 is converted into a rolling motion of the rolling member 308.

However, such a conventional displacement magnifying device cannot exhibit a large magnification rate of displacement of the piezoelectric element 302 which is to be magnified and transmitted to the rolling member 308. Accordingly, in the case of driving a printing wire, it is necessary to lengthen the rolling member 308, so as to obtain a sufficient stroke of the printing wire. Such a large size and an increased mass of the rolling member 308 cause a problem in high-speed operation of the printing wire.

In the case that the displacement magnifying device as shown in FIGS. 39(A) and 39(B) is utilized in a printing head for a wire dot printer (not shown), for example, a printing wire is connected directly to one end of the rolling member 308 or indirectly such as through another member to the one end of the rolling member 308, thus constructing a printing unit. A plurality of the printing units of the number equal to that of the printing wires are installed in the printing head. Each printing unit includes the piezoelectric element 302, and lead wires extending from both electrodes of the piezoelectric element 302 are guided to a certain wiring board, and are connected to feeder lines formed on the wiring board by soldering or the like. However, in the connection of the lead wires, they tend to be tangled with each other, making the connecting operation difficult. Further, it is also difficult to recognize the polarity of the lead wires.

Furthermore, the plurality of printing units are usually located between two parallel base plates, and the frame 300 of each printing unit is fixed to the base plates by a suitable fixing means such as bolts directed parallel to a direction of the displacement of the piezoelectric element 302. However, in fixing the frame 300 to the base plates, the frame 300 is expanded parallel to the direction of displacement of the piezoelectric element 302. Further, a fixed position of the frame 300 with respect to the direction parallel to the direction of displacement is slipped.

SUMMARY OF THE INVENTION

It is a first object of the present invention to provide a device for magnifying displacement of a piezoelectric element, including a pair of leaf springs displaceable in receipt of displacement of the piezoelectric element, which device may improve a magnification rate of the displacement of the piezoelectric element.

It is a second object of the present invention to provide a device for magnifying displacement of a piezoelectric element, including a pair of leaf springs displaceable in receipt of displacement of the piezoelectric element, which device may reduce friction between the leaf springs and thereby smoothen the displacement of one of the leaf springs relative to the other leaf spring.

It is a third object of the present invention to provide a device for magnifying displacement of a piezoelectric element, including a pair of leaf springs displaceable in receipt of displacement of the piezoelectric element and a rolling member fixed to the leaf springs, which device may reduce stress at a fixed portion between the leaf springs and the rolling member and thereby improve the durability of the fixed portion.

It is a fourth object of the present invention to provide a device for magnifying displacement of a piezoelectric element, including a pair of leaf springs displaceable in receipt of displacement of the piezoelectric element and a rolling member fixed to the leaf springs, which device may improve the durability of a fixed portion between the leaf springs and the rolling member and reduce the number of parts.

It is a fifth object of the present invention to provide a device for magnifying displacement of a piezoelectric element, including a pair of leaf springs displaceable in receipt of displacement of the piezoelectric element and a movable member provided at an end of the piezoelectric element for displacing one of the leaf springs relative to the other leaf spring, which device may prevent inclination of the movable member due to a reaction force from the leaf spring displaced to thereby prevent a reduction in magnification rate of the displacement.

It is a sixth object of the present invention to provide a method of producing a device for magnifying displacement of a piezoelectric element, including a frame, a movable member, a rolling member and a pair of leaf springs assembled with the movable member and the rolling member, which method may improve the accuracy of distance and parallelism between the movable member and a base portion of the frame in installation of the piezoelectric element therebetween.

It is a seventh object of the present invention to provide a device for magnifying displacement of piezoelectric elements to be electrically connected through lead wires to feeder lines, which device may make easy the connection between the leaf wires and the feeder lines and prevent the lead wires from being tangled.

It is an eighth object of the present invention to provide an impact dot printing head adapted to be driven by a plurality of printing units including piezoelectric elements and frames which units are fixedly supported between two base plates, which printing head may prevent expansion of the frame in fixing the printing units to the base plates and also prevent slippage of fixed positions of the frames.

According to a first aspect of the present invention, there is provided a device for magnifying displacement of a piezoelectric element adapted to be displaced by application of voltage thereto, comprising a frame extending substantially parallel to a direction of displacement of the piezoelectric element and mounting the piezoelectric element thereon, a movable member fixed to one end of the piezoelectric element with respect to the direction of displacement, a first mount surface formed on the frame and extending substantially parallel to the direction of displacement, a second mount surface formed on the movable member and extending substantially parallel to the direction of displacement, said second mount surface being opposed to the first mount surface, a first leaf spring mounted at its one end portion on the first mount surface and extending substantially parallel to the direction of displacement, a second leaf spring mounted at its one end portion on the second mount surface and extending substantially parallel to the direction of displacement, and a rolling member fixed to the other end portions of the first and second leaf springs, wherein when the piezoelectric element is displaced, the second leaf spring is displaced along the first leaf spring through the movable member to roll the rolling member.

According to a second aspect of the present invention, there is provided a device for magnifying displacement of a piezoelectric element adapted to be displaced by application of voltage thereto, comprising a frame extending substantially parallel to a direction of displacement of the piezoelectric element and mounting the piezoelectric element thereon, a movable member fixed to one end of the piezoelectric element with respect to the direction of displacement, a first mount surface formed on the frame and extending substantially parallel to the direction of displacement, a second mount surface formed on the movable member and extending substantially parallel to the direction of displacement, said second mount surface being opposed to the first mount surface, a first leaf spring mounted at its one end portion on the first mount surface and extending substantially parallel to the direction of displacement, a second leaf spring mounted at its one end portion on the second mount surface and extending substantially parallel to the direction of displacement, and a rolling member fixed to the other end portions of the first and second leaf springs, wherein when the piezoelectric element is displaced, the second leaf spring is displaced along the first leaf spring through the movable member to roll the rolling member, and wherein the first and second leaf springs include respective deformable portions facing to each other, and the deformable portions are formed at their facing surfaces with respective non-contact portions for inhibiting the inter-contact between the deformable portions.

According to a third aspect of the present invention, there is provided in a device for magnifying displacement of a piezoelectric element adapted to be displaced by application of voltage thereto, comprising a frame extending along the piezoelectric element and having a base portion for supporting one end of the piezoelectric element with respect to a direction of displacement, a movable member fixed to the other end of the piezoelectric element, a pair of first and second leaf springs fixed at their one end portions to the frame and the movable member, and a rolling member fixed to the other end portions of the leaf springs, wherein when the piezoelectric element is displaced, the leaf springs are deformed to roll the rolling member; the improvement wherein the leaf springs are formed from a single spring member to define a split groove therein extending from one end of the spring member toward the other end thereof, and the rolling member is integrally connected to the other end of the spring member.

According to a fourth aspect of the present invention, there is provided in a device for magnifying displacement of a piezoelectric element adapted to be displaced by application of voltage thereto, comprising a frame extending along the piezoelectric element and having a base portion for supporting one end of the piezoelectric element with respect to a direction of displacement, a movable member fixed to the other end of the piezoelectric element, a pair of first and second leaf springs fixed at their one end portions to the frame and the movable member, and a rolling member fixed to the other end portions of the leaf springs, wherein when the piezoelectric element is displaced, the leaf springs are deformed to roll the rolling member; the improvement wherein the first and second leaf springs are formed with a small sectional area portion at a portion except the fixed ends of the leaf springs, said small sectional area portion having a small sectional area in a direction substantially perpendicular to the direction of displacement of the piezoelectric element smaller than a sectional area of the fixed ends.

According to a fifth aspect of the present invention, there is provided a device for magnifying displacement of a piezoelectric element adapted to be displaced by application of voltage thereto, comprising a frame extending substantially parallel to a direction of displacement of the piezoelectric element and mounting the piezoelectric element on a base portion thereof, a movable member fixed to one end of the piezoelectric element with respect to the direction of displacement, a first mount surface formed on the frame and extending substantially parallel to the direction of displacement, a second mount surface formed on the movable member and extending substantially parallel to the direction of displacement, said second mount surface being opposed to the first mount surface, a first leaf spring mounted at its one end portion on the first mount surface and extending substantially parallel to the direction of displacement, a second leaf spring mounted at its one end portion on the second mount surface and extending substantially parallel to the direction of displacement, and a rolling member fixed to the other end portions of the first and second leaf springs, wherein when the piezoelectric element is displaced, the second leaf spring is displaced along the first leaf spring through the movable member to roll the rolling member, said device further comprising an elastically deformable connecting member extending along the piezoelectric element on an opposite side of the frame with respect to the movable member and connecting the movable member with a base portion of the frame, wherein when the piezoelectric element is displaced, the movable member is displaced substantially parallel to the direction of displacement against the elasticity of the connecting member to curve the second leaf spring relative to the first leaf spring and thereby roll the rolling member.

According to a sixth aspect of the present invention, there is provided a device for magnifying displacement of a piezoelectric element adapted to be displaced by application of voltage thereto, comprising a frame extending substantially parallel to a direction of displacement of the piezoelectric element and mounting the piezoelectric element on a base portion thereof, a movable member fixed to one end of the piezoelectric element with respect to the direction of displacement, a first mount surface formed on the frame and extending substantially parallel to the direction of displacement, a second mount surface formed on the movable member and extending substantially parallel to the direction of displacement, said second mount surface being opposed to the first mount surface, a first leaf spring mounted at its one end portion on the first mount surface and extending substantially parallel to the direction of displacement, a second leaf spring mounted at its one portion on the second mount surface and extending substantially parallel to the direction of displacement, and a rolling member fixed to the other end portions of the first and second leaf springs, wherein when the piezoelectric element is displaced, the second leaf spring is displaced along the first leaf spring through the movable member to roll the rolling member, said device further comprising a four-hinged parallel link mechanism provided between the frame and the movable member for maintaining the parallelism of the movable member to the direction of displacement of the piezoelectric element.

According to a seventh aspect of the present invention, there is provided a method of producing a device for magnifying displacement of a piezoelectric element adapted to be displaced by application of voltage thereto, said device comprising a frame extending substantially parallel to a direction of displacement of said piezoelectric element; a movable member fixed to one end of said piezoelectric element with respect to the direction of displacement; a first mount surface formed on said frame and extending substantially parallel to the direction of displacement; a second mount surface formed on said movable member and extending substantially parallel to the direction of displacement, said second mount surface being opposed to said first mount surface; a first leaf spring mounted at its one end portion on said first mount surface and extending substantially parallel to the direction of displacement; a second leaf spring mounted at its one end portion on said second mount surface and extending substantially parallel to the direction of displacement; and a rolling member fixed to the other end portions of said first and second leaf springs, wherein when said piezoelectric element is displaced, said second leaf spring is displaced along said first leaf spring through said movable member to roll said rolling member, said method comprising a first step of forming said movable member integrally with said frame through a connecting portion in such a manner as a space for inserting therein said piezoelectric element is defined between said movable member and a base portion of said frame; a second step of fixing said leaf spring to said frame and said movable member; and a third step of forming a separation groove in said connecting portion to separate said movable member from said frame.

According to an eighth aspect of the present invention, there is provided an impact dot printing head of a type to be driven by a piezoelectric element adapted to be displaced by application of voltage thereto, comprising a plurality of printing units each having a printing wire for printing dots onto a printing medium, a displacement transmitting mechanism for transmitting displacement of the piezoelectric element to the printing wire, and a frame for supporting the piezoelectric element and the displacement transmitting mechanism, said frame extending in a direction of displacement of the piezoelectric element; a first base plate for fixedly supporting one end of the frame with respect to the direction of displacement of the piezoelectric element; a second base plate for fixedly supporting the other end of the frame with respect to the direction of displacement of the piezoelectric element, said second base plate having a nose portion for supporting the printing wire; a first fixing means for fixing the first base plate to the frame; and a second fixing means for fixing the second base plate to the frame, wherein at least one of the first and second fixing means is so arranged as to intersect the direction of displacement of the piezoelectric element.

According to a ninth aspect of the present invention, there is provided an impact dot printing head of a type to be driven by a piezoelectric element adapted to be displaced by application of voltage thereto, comprising a displacement transmitting mechanism for transmitting displacement of the piezoelectric element to a printing wire for printing dots onto a printing medium; a base plate for supporting the piezoelectric element; a wiring board fixed to the base plate for supporting a feeder line to be electrically connected to a lead wire connected to the piezoelectric element; and a holder having a cylindrical portion to be engaged with an outer periphery of the piezoelectric element and a leg portion extending from one end of the cylindrical portion toward the wiring board, said leg portion having a through-hole for inserting the lead wire.

According to a tenth aspect of the present invention, there is provided a method of producing a device for magnifying displacement of an elongated piezoelectric element adapted to be displaced by application of voltage thereto, comprising a first step of forming an integral frame body having a main frame extending along one side of said piezoelectric element, a supporting portion for supporting one end of said piezoelectric element with respect to a direction of displacement of said piezoelectric element, a movable member mounted on the other end of said piezoelectric element with respect to the direction of displacement of said piezoelectric element, and a sub frame extending along the other side of said piezoelectric element opposite to said main frame; a second step of fixing a pair of leaf springs connected at one end with a rocking member to said main frame and said movable member; a third step of forming a first parting slit between said main frame and said movable member and a second parting slit between said movable member and said sub frame to separate said main frame, said movable member and said sub frame; a fourth step of fixing a quadri-hinged parallel link mechanism between said movable member and said sub frame; and a fifth step of fixing said piezoelectric element between said supporting portion and said movable member.

As mentioned above, the main frame, the movable member and the sub frame are separated by forming the first and second parting slits in the integral frame body. Therefore, the formation of these members can be simplified more than a method of independently forming these members and then mounting them together. Further, the accuracy of arrangement of these members can be made high.

The invention will be more fully understood from the following detailed description and appended claims when taken with the drawings.

BRIEF DESCRIPTION OF THE DRAWINGS

FIG. 39(A) is a schematic elevational view of the conventional device for magnifying displacement of a piezoelectric element, illustrating an inoperative condition;

FIG. 39(B) is a view similar to FIG. 39(A), illustrating an operative condition;

DETAILED DESCRIPTION OF THE PREFERRED EMBODIMENTS

There will now be described some preferred embodiments of the present invention with reference to the drawings.

Figure 1:
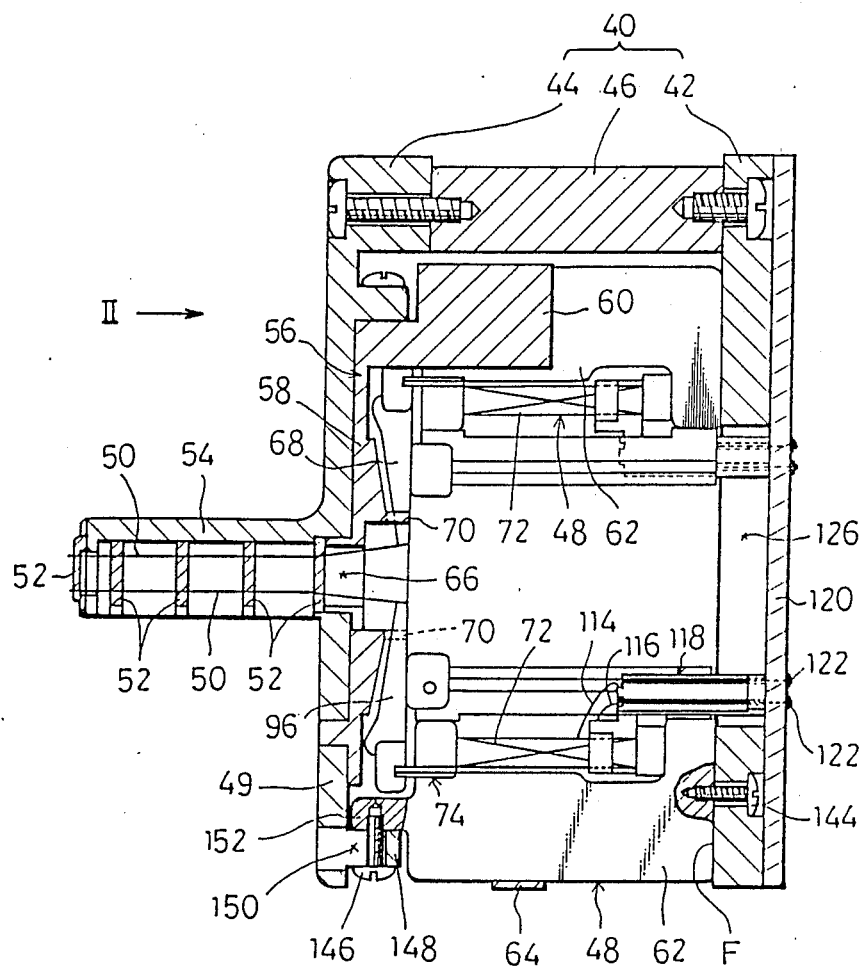
FIG. 1 is a vertical sectional view of a preferred embodiment of the printing head according to the present invention.
Figure 2:
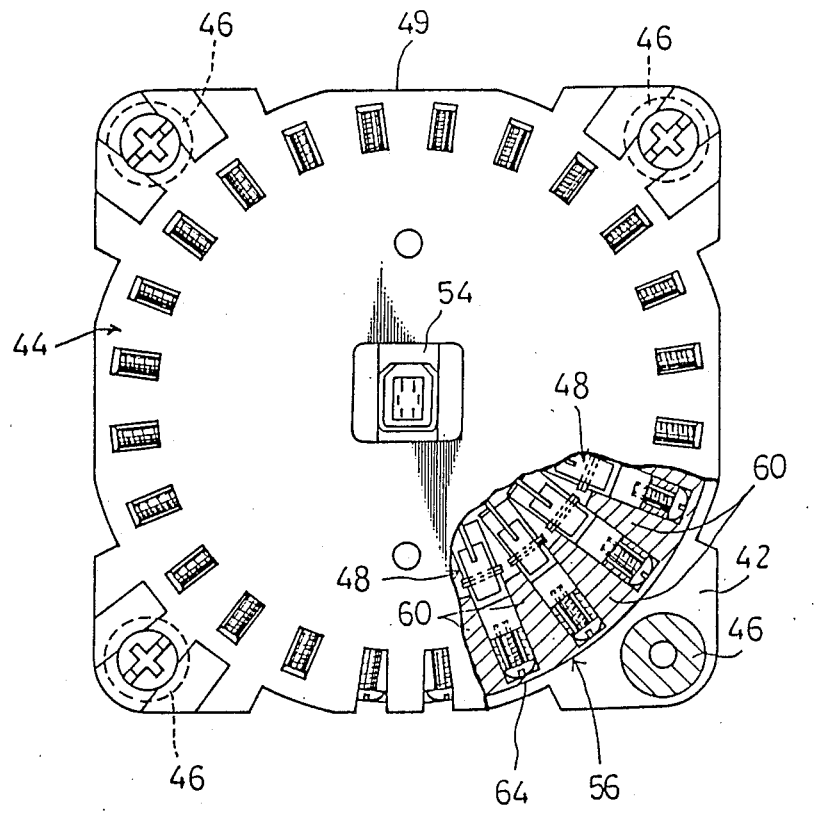
FIG. 2 is a side view as viewed from the arrow II in FIG. 1.

Referring to FIGS. 1 and 2 which show a printing head in vertical section and side, respectively, a head body 40 primarily consists of first and second substantially rectangular base plates 42 and 44 opposed to each other at a predetermined distance, and four posts 46 connecting the base plates 42 and 44 at the four corners thereof.

A plurality of (twenty four, for example) printing units 48 are provided between the first and second base plates 42 and 44 in such a manner as to be arranged on a circle concentric with a common center line of both the base plates 42 and 44.

The second base plate 44 is formed with a substantially circular plate portion 49 disposed along the printing units 48, and with a hollow nose portion 54 extending outward from the plate portion 49. The nose portion 54 includes a plurality of guide plates 52 for guiding the movement of each printing wire 50 connected to each printing unit 48. A support member 56 is provided on the inner surface of the second base plate 44 to position and support each printing unit 48. The support member 56 primarily consists of a circular support plate 58 disposed along the inner surface of the second base plate 44 and a plurality of partition walls 60 radially extending inward from the support plate 58 in such a manner that each partition wall 60 is interposed between the adjacent printing units 48. The partition walls 60 are integrally formed with a support ring 64 for supporting the outer surface of each frame 62 of the printing units 48. The support plate 58 is formed at its central portion with a central hole 66 communicated with the axial hole of the nose portion 54. A plurality of guide pins 70 project from the inner surface of the support plate 58 in such a manner as to be arranged around the central hole 66, for guiding each wire driving arm 96 of the printing units 48.

Figure 3:
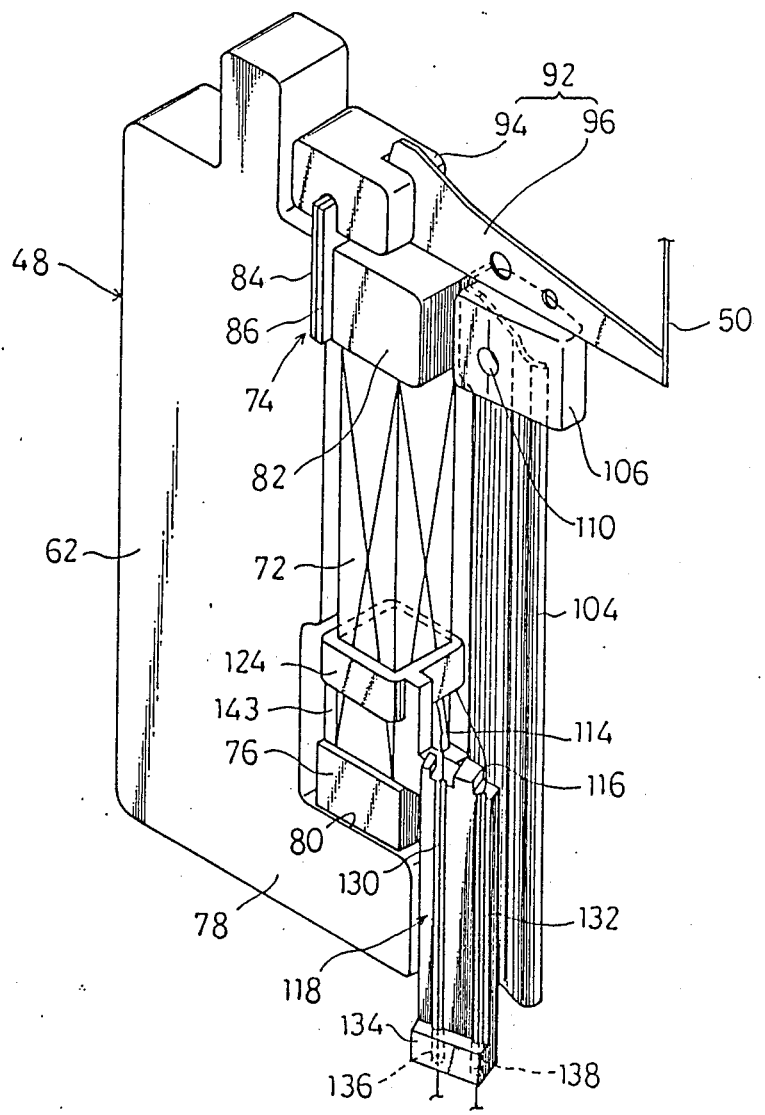
FIG. 3 is a perspective view of a printing unit installed in the printing head shown in FIG. 1.
Figure 4:
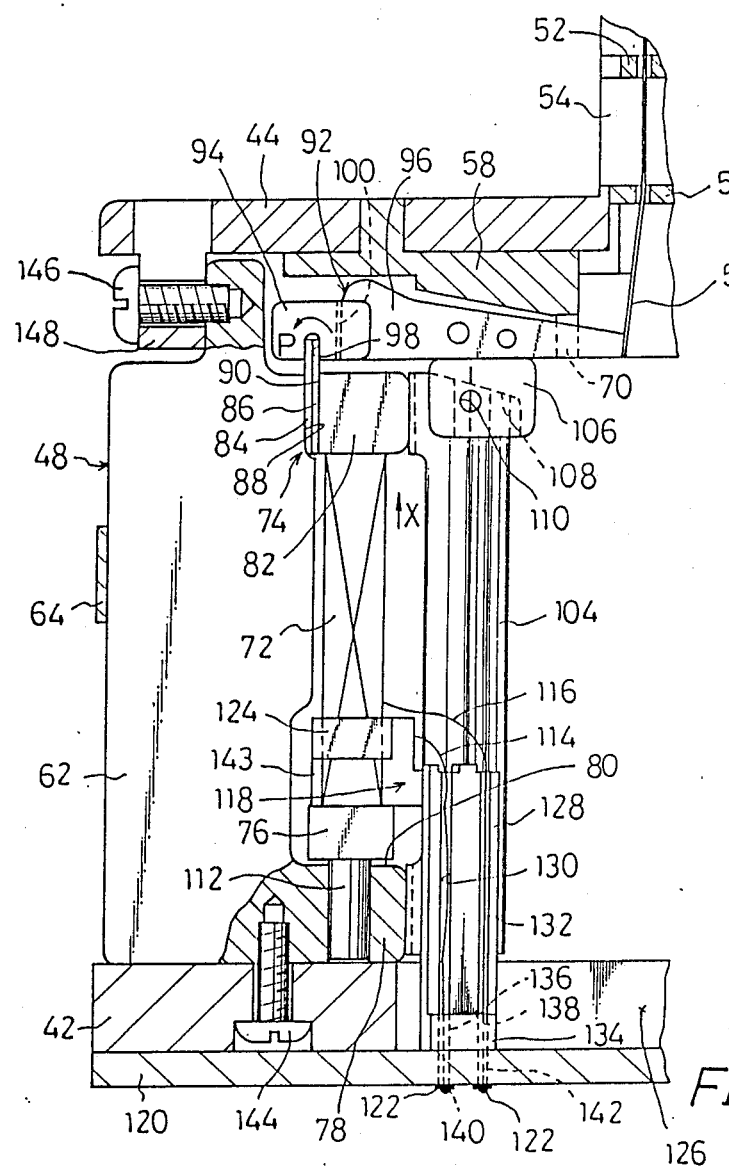
FIG. 4 is an elevational view in partial section of the printing unit shown in FIG. 3.
Figure 5:
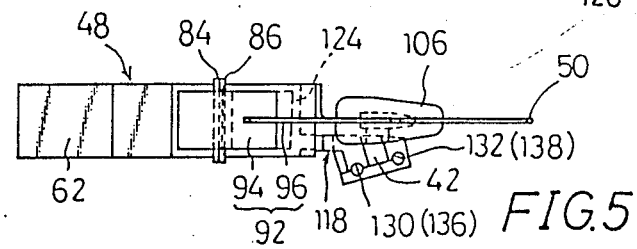
FIG. 5 is a plan view of FIG. 3.

Referring to FIGS. 3, 4 and 5, each printing unit 48 includes a piezoelectric element 72 adapted to be expanded and contracted by the application of voltage thereto and a displacement transmitting mechanism 74 adapted to magnify the expansion and contraction of the piezoelectric element 72 and transmit such a magnified displacement to the printing wire 50. The piezoelectric element 72 and the displacement transmitting mechanism 74 are supported to the frame 62.

The frame 62 is formed of a metal plate having a predetermined thickness and an elongated shape in such a manner as to extend in substantially parallel to the displacement direction of the piezoelectric element 72. The frame 62 is formed at its lower end with a laterally extending base portion 78 for supporting one end of the piezoelectric element 72 through a temperature compensation member 76.

The piezoelectric element 72 is formed by a stack of piezoelectric ceramics adapted to be expanded and contracted in the direction of the stack (in the longitudinal direction of the piezoelectric element 72). The temperature compensation member 76 is fixed to one end surface of the piezoelectric element 72 by an adhesive or the like. The piezoelectric element 72 is supported through the temperature compensation member 76 onto a support surface 80 of the support portion 78.

A rectangular movable member 82 is fixed to the other end surface of the piezoelectric element 72 by an adhesive or the like. The movable member 82 has a side surface opposed to an upper side surface of the frame 62 with a given spacing defined therebetween. The given spacing is filled with a pair of first and second leaf springs 84 and 86 to be fixed to spring mounting surfaces 88 and 90 of the frame 62 and the movable member 82, respectively. The spring mounting surfaces 88 and 90 are flat surfaces extending in substantially parallel to the displacement direction of the piezoelectric element 72. The spring mount surface 90 of the movable member 82 is located at an end surface of the movable member 82 offset from a center line of the piezoelectric element 72 to the frame 62.

The first leaf spring 84 has a side surface entirely fixed by brazing or the like to the spring mounting surface 88 of the frame 62, while the second leaf spring 86 has a side surface entirely fixed by brazing or the like to the spring mounting surface 90 of the movable member 82. The second leaf spring 86 is movable relative to the first leaf spring 84 under the condition where the opposed surfaces of both the leaf springs 84 and 86 are in contact.

The first and second leaf springs 84 and 86 extend upward by a given length from the upper ends of the spring mounting surfaces 88 and 90 along the displacement direction of the piezoelectric element 72. A rolling member 92 is fixed to the upper ends of the first and second leaf springs 84 and 86. The rolling member 92 primarily consists of a base member 94 having a high rigidity and a lightweight wire driving arm 96 connected to the base member 94.

The base member 94 of the rolling member 92 is formed at its lower surface with a horizontal recess 98 for receiving the upper ends of the first and second leaf springs 84 and 86. The surfaces (back surfaces) opposite the facing surfaces of the leaf springs 84 and 86 are fixed by brazing to the inner surface of the recess 98. The base member 94 is further formed at its front surface with a vertical recess 100 for receiving the base portion of the wire driving arm 96. The base portion is fixed in the vertical recess 100 by brazing. The printing wire 50 is fixed at its one end to the front end of the wire driving arm 96 by brazing.

In order to move the movable member 82 in parallel to the displacement direction of the piezoelectric element 72, there is provided an elastically deformable connection member 104 between the frame 62 and the movable member 82. The connection member 104 extends vertically along the displacement direction of the piezoelectric element 72 on the opposite side of the frame 62 with respect to the piezoelectric element 72. A lower end portion of the connection member 104 is fixed to an end surface of the base portion 78 of the frame 62, while an upper end portion of the connection member 104 is fixed to a front end surface of the movable member 82 on the opposite side of the second leaf spring 86.

The connection member 104 is formed by a thin-walled planar material having a width in a plane parallel to the side surface of the frame 62. Such arrangement of the connection member 104 contributes to ensure a high rigidity of the connection member 104 in a rolling direction of the movable member 82 rolled by a reaction force of the leaf spring 86. Further, an elastic force of the connecting member 104 is set so that the moving force of the movable member 82 due to the expansion of the piezoelectric element 72 may be applied substantially uniformly to the leaf spring 86 and the connection member 104. That is, the elastic force of the connection member 104 is set to be smaller than that of the leaf spring 86. For example, the ratio of the elastic forces of the connection member 104 and the leaf spring 86 is set to be about 1:1.5 under the unoperational condition of the piezoelectric element 72. This is due to the fact that when the leaf spring 86 is curved by the upward movement of the movable member 82, a substantially vertical component (a component in the displacement direction of the piezoelectric element 72) of the elastic force of the leaf spring 86 is required to be equal to the elastic force of the connection member 104 under the operational condition. Therefore, the elastic force of the connection member 104 is set to be smaller than that of the leaf spring 86. If the elastic force of the connection member 104 is greater than that of the leaf spring 86 under the operational condition of the piezoelectric element 72, the movable member generates a clockwise moment to hinder smooth vertical motion of the movable member 82 and also badly affect smooth expansion of the piezoelectric element 72. Thus, the provision of the connection member 104 contributes to substantially prevent the inclination of the movable member 82.

A back stopper 106 formed of low elastic rubber is fixed at an upper end of the connection member 104, so that when the rolling member 92 is rolled and returned, the lower edge of the wire driving arm 96 abuts against the upper surface of the back stopper 106. The back stopper 106 is formed with a recess 108 for receiving the upper end portion of the connection member 104, and is further formed with a side hole 110 for filling an adhesive therethrough into the recess 108. Thus, the back stopper 106 is fixed to the connection member 104 by the adhesive.

The temperature compensation member 76 bonded to the lower surface of the piezoelectric element 72 functions to compensate the expansion or contraction of the piezoelectric element 72 due to a peripheral temperature change and thereby maintain constant the height from the support surface 80 of the base portion 78 of the frame 62 to the upper end of the piezoelectric element 72.

A thrust pin 112 is fitted into the base portion 78 for supporting the lower surface of the temperature compensation member 76, and is then fixed integrally with the base portion 78 by means of beam welding. The thrust pin 112 operates to slightly upwardly thrust the lower surface of the temperature compensation member 76 on the support surface 80, thereby applying the spring forces of the connection member 104 and the second leaf spring 86 to the piezoelectric element 72 at all times.

Lead wires 114 and 116 are connected at respective each one end to both electrodes of the piezoelectric element 72 of each printing unit 48, and are connected at respective each other end to given feeder lines 122 by welding. The feeder lines 122 are supported on a wiring plate 120 formed of an electrical insulator material. The wiring plate 120 is fixed to the outer surface of the first base plate 42. The lead wires 114 and 116 are supported on a holder 118 formed of an electrical insulator material.

Each holder 118 is primarily composed of a rectangular cylindrical portion 124 surroundingly engaged with the outer periphery of the piezoelectric element 72 and a leg portion 128 extending from one side of the cylindrical portion 124 through a hole 126 formed through the first base plate 42 to the inner surface of the wiring plate 120. The leg portion 128 of the holder 118 is formed on its one side surface with a pair of guide channels 130 and 132 for guiding and supporting the lead wires 114 and 116 led out from both the electrodes of the piezoelectric element 72 toward the wiring plate 120. The leg portion 128 is further formed at its lower end with a projection 134 projecting from the one side surface of the leg portion 128. The projection 134 has a pair of guide holes 136 and 138 straight communicated with the guide channels 130 and 132. The wiring plate 120 also has a pair of guide holes 140 and 142 straight communicated with the guide holes 136 and 138 of the projection 134. Thus, the lead wires 114 and 116 guided by the guide channels 130 and 132 pass through the guide holes 136 and 138 of the projection 134 and the guide holes 140 and 142 of the wiring plate 120. Then, the lead wires 114 and 116 from the guide holes 140 and 142 are connected by soldering to the feeder lines 122.

The rectangular cylindrical portion 124 is formed at its lower end on the opposite side of the leg portion 128 with a downward projection 143 bonded at its lower end to the temperature compensation member 76, so as to support the cylindrical portion 124. The cylindrical portion 124 is loosely fitted around the piezoelectric element 72 so as not to hinder the expansion and contraction of the piezoelectric element 72. The feeder lines 122 on the wiring plate 120 are supplied with a signal corresponding to print data from a control circuit.

Referring back to FIG. 1, the inner surface of the first base plate 42 is defined as a reference surface F, and one end surface of the frame 62 of each printing unit 48 is brought into abutment against the reference surface F. Then, a tightening screw 144 is threadly inserted from the outer surface of the first base plate 42 in a direction parallel to the displacement direction of the piezoelectric element 72 into one end portion of the frame 62, thus fixing the one end portion of the frame 62 to the first base plate 42.

The circular plate portion 49 of the second base plate 44 is formed at its outer periphery on the inner surface thereof with a plurality of mounting projections 148 projecting inwardly perpendicularly therefrom. Each projection 148 has a hole 150 elongated in a direction parallel to the displacement direction of the piezoelectric element 72. A tightening screw 146 is inserted through each hole 150 of the projection 148 in a direction intersecting the displacement direction, preferably in a direction perpendicular thereto, and is threaded into a mounting projection 152 projecting outwardly from the other end surface of the frame 62, thus fixing the other end portion of the first base plate 44.

In this preferred embodiment, the support posts 46 of the head body 40, the frames 62 and the connection members 104 of the printing units 48 are formed of a material having the same coefficient of linear thermal expansion, so as to cope with a temperature change.

In operation, when a print data signal is output from the control circuit to each printing unit 48 to apply voltage across both the electrodes of the piezoelectric element 72, the piezoelectric element 72 is expanded by a fixed length in the direction of stack of the ceramics, namely, in the direction of arrow X shown in FIG. 4 to thereby lift the movable member 82. As a result, the second leaf spring 86 receives the moving force of the movable member 82, and is accordingly lifted along the first leaf spring 84. At this moment, the second leaf spring 86 is elastically deformed to be curved between the movable member 82 and the base portion 94 of the rolling member 92. Such an elastic deformation of the second leaf spring 86 generates a moment in the direction of arrow P shown in FIG. 4. As a result, the first leaf spring 84 is slightly elastically deformed, and simultaneously the rolling member 93 is rolled, so that the printing wire 50 connected at the tip of the rolling member 92 is driven to advance as being guided by the guide plates 52. Accordingly, an end of the printing wire 50 is forced against a printing ribbon (not shown), thus carrying out printing. In this preferred embodiment, the opposed surfaces of the first and second leaf springs 84 and 86 contact with each other. As compared with the case that the first and second leaf springs 84 and 86 were spaced a certain distance from each other, the preferred embodiment can provide a greater magnification of expansion of the piezoelectric element 72 owing to the above arrangement of the leaf springs 84 and 86. Accordingly, a requisite stroke of the printing wire 50 can be sufficiently provided.

When the voltage applied to the piezoelectric element 72 is cut off, the piezoelectric element 72 under the expanded condition is returned to its original condition. Then, the movable member 82, the leaf springs 84 and 86 and the rolling member 92 are all returned to their original condition, thus retracting the printing wire 50 to its original position.

As mentioned above, the flat surfaces of the first and second leaf springs 84 and 86 are fixed by brazing or the like to the flat spring mounting surfaces 88 and 90 of the frame 62 and the movable member 82. Therefore, large fixing areas between the frame 62 and the first leaf spring 84 and between the movable member 82 and the second leaf spring 86 may be provided to thereby ensure strong and stable fixed condition. Furthermore, as the volumes of the frame 62 and the movable member 82 are large, these members may have a large rigidity.

Further, the base portion 94 of the rolling member 92 as fixed to the respective end portions of the first and second leaf springs 84 and 86 has a width substantially the same as that of the leaf springs 84 and 86, and has a large volume, so that the base portion 94 may also have a large rigidity. Owing to the large rigidity of the frame 62, the movable member 82 and the base portion 94 of the rolling member 92, the leaf springs 84 and 86 are deformed at a limited portion among the frame 62, the movable member 82 and the base portion 94, thereby suppressing a reduction in displacement magnification rate. Moreover, excess vibration of the leaf springs 84 and 86, the frame 62, the movable member 82 and the base portion 94 may be eliminated to thereby reduce a time till the stoppage of the rolling member 92 including the wire supporting arm 96, that is, to increase a natural frequency of the whole movable element including the rolling member 92, the leaf springs 84 and 86, etc. As a result, a high-speed operation of the rolling member 92 may be achieved.

Furthermore, in this preferred embodiment, as the end surface of the base portion 78 of the frame 62 and the end surface of the movable member 82 opposite the second leaf spring 86 are connected to each other by means of the elastically deformable connection member 104, the moving force of the movable member 82 generated by the expansion of the piezoelectric element 72 is substantially uniformly received by the second leaf spring 86 and the connection member 104. Accordingly, the movable member 82 may be moved in a direction parallel to the displacement direction of the piezoelectric element 72, thereby preventing the generation of a bending moment in the piezoelectric element 72. Therefore, in spite of the fact that the piezoelectric element 72 is formed of piezoelectric ceramics which are less resistant against a bending stress, the piezoelectric element 72 may be prevented from being damaged to thereby improve the durability.

In installing each printing unit 48 into the head body 40, the printing unit 48 is first inserted into the adjacent partition walls 60 of the supporting member 56 on the second base plate 44, and is then temporarily mounted at its one end to the second base plate 44 by means of the tightening screw 146. Then, the first base plate 42 is mounted to the printing unit 48 in such a manner that the other end of the frame 62 abuts against the reference surface F of the first base plate 42, and is fixed to the printing unit 48 by tightening the screw 144 in a direction parallel to the displacement direction of the piezoelectric element 72. Thereafter, the screw 146 is tightened in a direction perpendicular to the displacement direction of the piezoelectric element 72 to fix the frame 62 at the mounting portion 152 to the second base plate 44. Thusly, the frame 62 of each printing unit 48 is fixed at its both ends to the first and second base plates 42 and 44. As compared with the case that tightening means (bolts or screws) are tightened in a direction parallel to the displacement direction of the piezoelectric element 72 to fix the frame 62 to the first and second base plates 42 and 44, this preferred embodiment may reduce the dispersion in mounting position of the frame 62 with respect to the displacement direction of the piezoelectric element 72. Further, the tightening forces of the screws 144 and 146 do not operate to expand the frame 62 in the displacement direction of the piezoelectric element 72, thereby preventing the expansion of the frame 62 upon tightening of the screws 144 and 146.

As mentioned above with reference to FIGS. 3 and 4, the lead wires 114 and 116 connected to both the electrodes of each piezoelectric element 72 are guided through the guide channels 130 and 132 of the leg portion 128 of the holder 118, and are inserted through the holes 136 and 138 of the leg portion 128 and through the holes 140 and 142 of the wiring plate 120. Then, each end of the lead wires 114 and 116 is connected by soldering to the feeder lines 122 on the wiring plate 120. With this arrangement, it is possible to prevent interference or entanglement between the lead wires 114 and 116 and make the soldering work easy. Further, it is also possible to prevent that the lead wires 114 and 116 are erroneously soldered to the electrodes of the piezoelectric element 72.

In this embodiment, the frame 62, the connection member 104 and the movable member 82 are formed independently, and are then integrally fixed together by brazing or the like. Therefore, the supporting surface 80 of the base portion 78 of the frame 62 and the fixing surface of the movable member 82 to the piezoelectric element 72 may be easily finished with a high accuracy. Accordingly, the displacement of the piezoelectric element 72 upon application of voltage thereto may be reliably transmitted to the movable member 82 and the second leaf spring 86. Alternatively, the frame 62, the connection member 104 and the movable member 82 may be integrally formed from a single metal plate.

Further, the first base plate 42 may be formed at its outer periphery on the inner surface with a perpendicular projection for threadedly inserting thereinto the tightening screw 144 in a direction perpendicular to the displacement direction of the piezoelectric element 72. As to the tightening screw 146 on the second base plate 44 side, the screw 146 may be tightened in either of the direction perpendicular or parallel to the displacement direction of the piezoelectric element 72.

Figure 6:
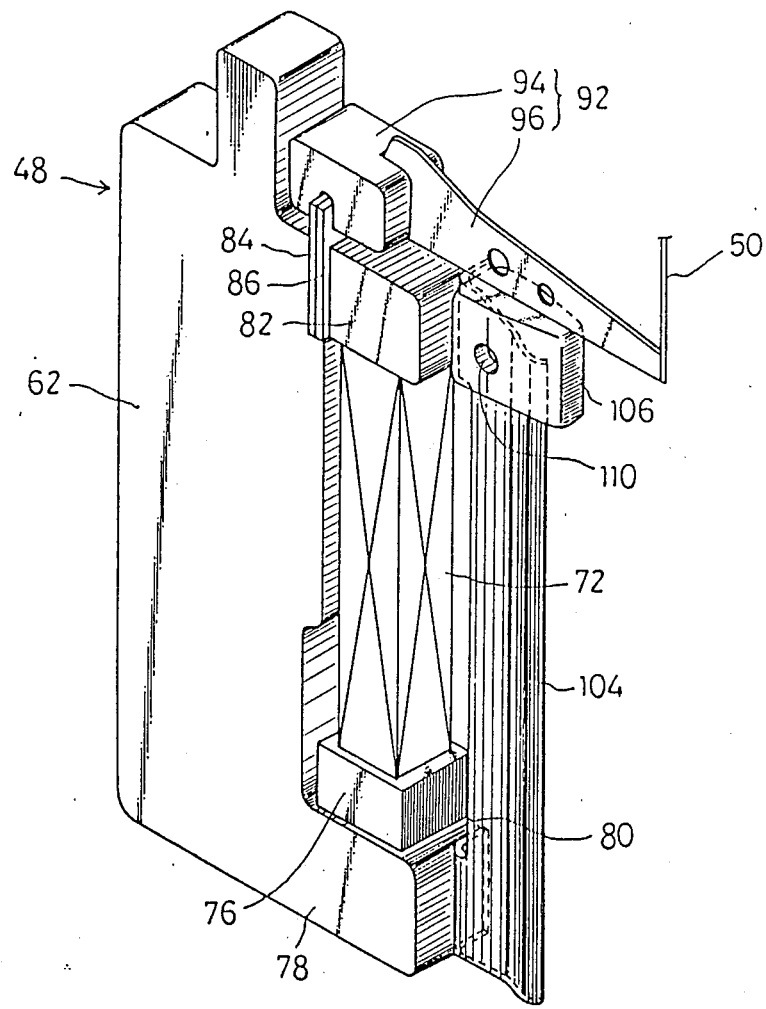
FIG. 6 is a perspective view of a modification of the printing unit.

As shown in FIG. 6, the holder 118 shown in FIG. 3 may be removed. In this case, the lead wires 114 and 116 are directly led to the feeder lines 122 on the wiring plate 120.

Although it is preferable to contact the leaf springs 84 and 86 for the purpose of increasing the displacement magnifying rate to the maximum as associated with the expansion of the piezoelectric element 72, the leaf springs 84 and 86 may be spaced a small distance.

Figure 7:
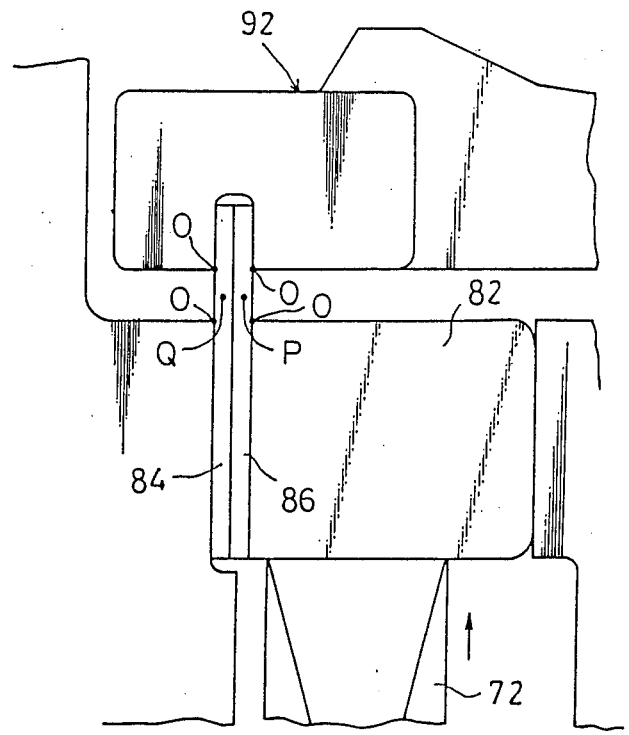
FIG. 7 is an enlarged elevational view of the essential part of the printing unit shown in FIG. 3.
Figure 8:
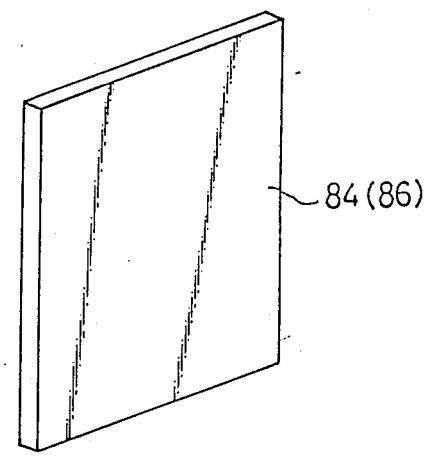
FIG. 8 is a perspective view of one of the leaf springs shown in FIG. 7.

FIG. 8 shows an expanded perspective view of the leaf spring 84(86). Both the leaf springs 84 and 86 are formed from a rectangular elastic plate having uniform thickness and width. As shown in FIG. 7, upon application of voltage to the piezoelectric element 72, the leaf spring 86 fixed to the movable member 82 is upwardly displaced in parallel to the leaf spring 84 fixed to the frame 62. At the same time, both the leaf springs 84 and 86 are elastically deformed to generate a stress therein. The stress tends to be concentrated at a fixed edge of the leaf springs 84 and 86, e.g., near the point 0 shown in FIG. 7.

Referring next to FIGS. 9 to 12 which show a second preferred embodiment intending to reduce such a stress concentration in the first preferred embodiment and improve the durability of the leaf springs. In the second preferred embodiment, the same or like parts as in the first preferred embodiment are designated by the same reference numerals, and the related explanation will be omitted hereinafter.

Figure 9:
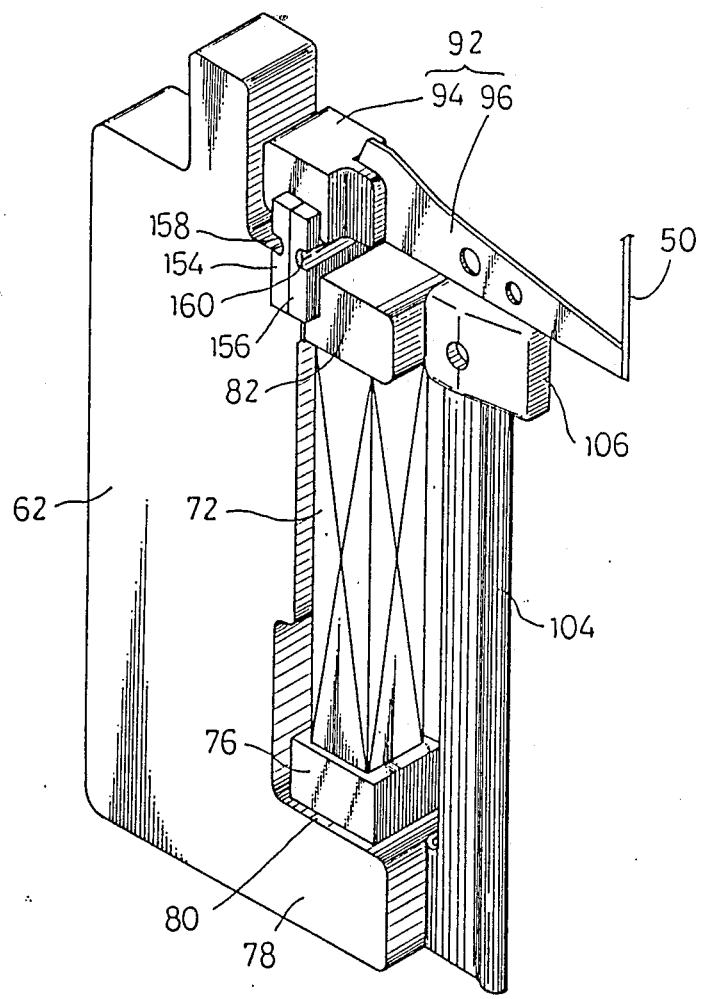
FIG. 9 is a perspective view of a modification of the printing unit.
Figure 10:
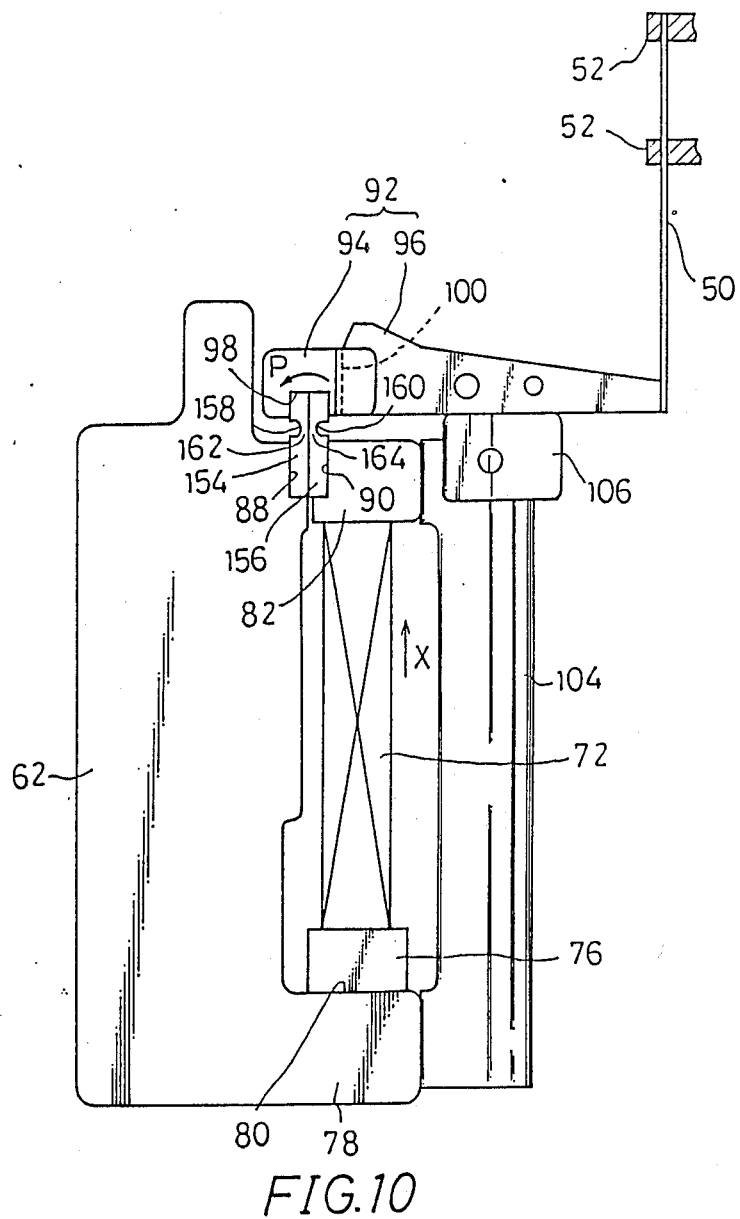
FIG. 10 is an elevational view of FIG. 9.
Figure 11:
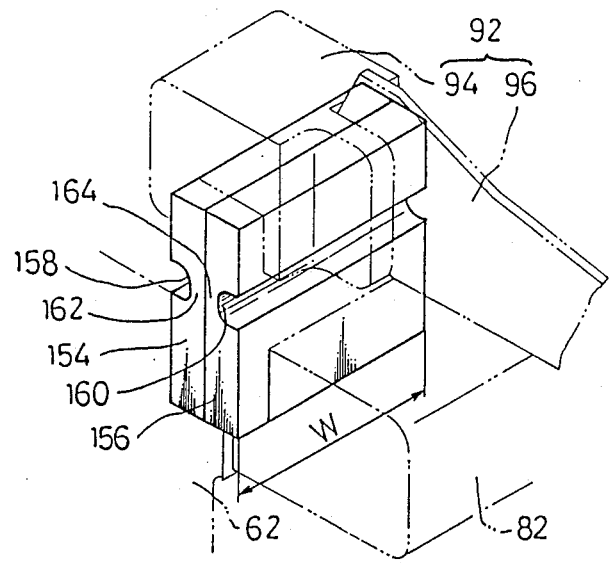
FIG. 11 is a perspective view of the leaf springs shown in FIG. 9.

As shown in FIGS. 9 and 10, a second leaf spring 156 fixed to the movable member 82 is adapted to be displaced in parallel to a first leaf spring 154 fixed to the frame 62 upon expansion of the piezoelectric element 72, resulting in rolling of the rolling member 92. The leaf springs 154 and 156 are constructed in such a manner that a sectional area in a direction perpendicular to the displacement direction is reduced at an intermediate position of the displacement direction. That is, as clearly shown in FIGS. 11 and 12, the first and second leaf springs 154 and 156 are formed on their side surfaces opposite to the facing surfaces with sectional U-shaped grooves 158 and 160 extending across the width W of the leaf springs, respectively. As a result, there are formed thin-walled portions 162 and 164 at the positions of the grooves 158 and 160 of the first and second leaf springs 154 and 156. In other words, the first leaf spring 154 has a large sectional area at the fixed portions fixed to the frame 62 and the rolling member 92, but has a small sectional area at the thin-walled portion 162, namely, at the elastically deformable portion. Similarly, the second leaf spring 156 also has a large sectional area at the fixed portions fixed to the movable member 82 and the rolling member 92, but has a small sectional area at the thin-walled portion 164.

Figure 12:
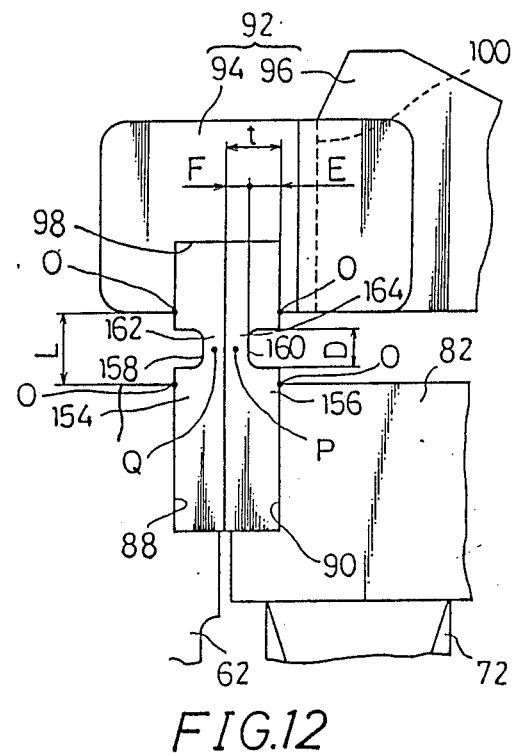
FIG. 12 is an elevational view of FIG. 11.

When the second leaf spring 156 is displaced in substantially parallel to the first leaf spring 154 upon expansion of the piezoelectric element 72, and both the leaf springs 154 and 156 are elastically deformed, the stress is primarily applied to the thin-walled portions 162 and 164 having a small sectional area, thereby greatly reducing the stress to be applied to the upper and lower fixed (brazed) edges of the leaf springs 154 and 156, e.g., at the point O shown in FIG. 12. Accordingly, it is possible to prevent the generation of cracking at the fixed edges due to repeated elastic deformation of the leaf springs 154 and 156 and thereby improve the durability.

In accordance with CAEDS (tradename of structure analysis software produced by International Business Machines Corporation), the present inventors have investigated to calculate the stresses to be applied at the points O, P and Q of the leaf springs 154 and 156 shown in FIG. 12 and the stresses to be applied at the points O, P and Q of the leaf springs 84 and 86 shown in FIG. 7 as having the uniform width and thickness. The result of calculation is shown in Table 1.

TABLE 1

| | Conditions | | Stress (kg/mm$^2$) | | |
|---|---|---|---|---|---|
| | Rate of Magnification (%) | Natural Frequency (KHz) | O | P | Q |
| Example of FIG. 12 | 230 | 2.5 | 7.6 | 54.9 | 56.2 |
| Example of FIG. 7 | 230 | 2.5 | 14.4 | 50.6 | 51.2 |

The dimensions of the leaf springs 154 and 156 shown in FIG. 12 and the leaf springs 84 and 86 shown in FIG. 7 are shown in Table 2.

TABLE 2

| | W (mm) | t (mm) | L (mm) | D (mm) | E (mm) | F (mm) |
|---|---|---|---|---|---|---|
| Example of FIG. 12 | 4.0 | 0.8 | 1.2 | 0.8 | 0.52 | 0.28 |
| Example of FIG. 7 | 4.0 | 0.28 | 0.8 | — | — | — |

Where the characters W, t, L, D, E and F stand for a width of each leaf spring, a thickness of each leaf spring, a vertical distance of the unfixed portion of each leaf spring, a width of the U-shaped groove, a depth of the U-shaped groove and a thickness of the thin-walled portion, respectively.

As apparent from Table 1, the stress at the point O in Example of FIG. 12 is made substantially half the stress at the point O in Example of FIG. 7.

Figure 13:
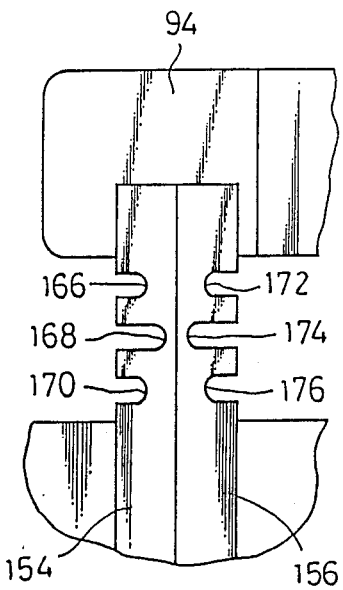
FIG. 13 is an elevational view of a modification of FIG. 12.

Referring to FIG. 13 which shows a modification of Example shown in FIGS. 9 to 12, the first leaf spring 154 is formed on its outer side surface with three U-shaped grooves 166, 168 and 170 extending across the width of the leaf spring 154 and arranged in uniformly spaced relationship from each other in the displacement direction of the leaf spring 154. The central groove 168 has a depth greater than the other grooves 166 and 170. Similarly, the second leaf spring 156 is formed on its side surface opposite to the outer side surface of the first leaf spring 154 with three U-shaped grooves 172, 174 and 176 similar to the U-shaped grooves 166, 168 and 170. With this arrangement, the stress is prevented from being concentrated at the thin-walled portions corresponding to the central deep grooves 168 and 174, and may be dispersed to the other thin-walled portions corresponding to the shallow grooves 166, 170, 172 and 176.

Figure 14:
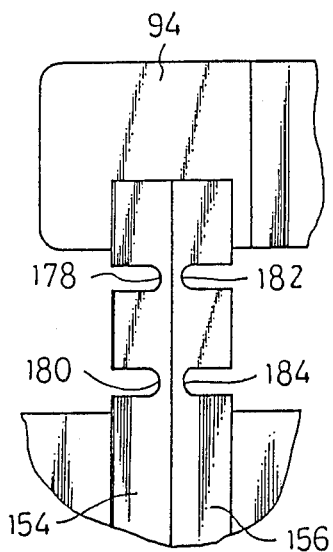
FIG. 14 is an elevational view of another modification of FIG. 12.

Referring to FIG. 14 which shows another modification of Example shown in FIGS. 9 to 12, the first leaf spring 154 is formed on its outer side surface with a pair of U-shaped grooves 178 and 180 extending across the width of the leaf spring 154 and arranged in given spaced relationship from each other in the displacement direction of the leaf spring 154. The grooves 178 and 180 have the same width and depth. Similarly, the second leaf spring 156 is formed on its side surface opposite to the outer side surface of the first leaf spring 154 with a pair of U-shaped grooves 182 and 184 similar to the grooves 178 and 180. With this arrangement, the stress is substantially uniformly dispersed to the thin-walled portions formed between the grooves 178, 182 and 180, 184.

Figure 15:
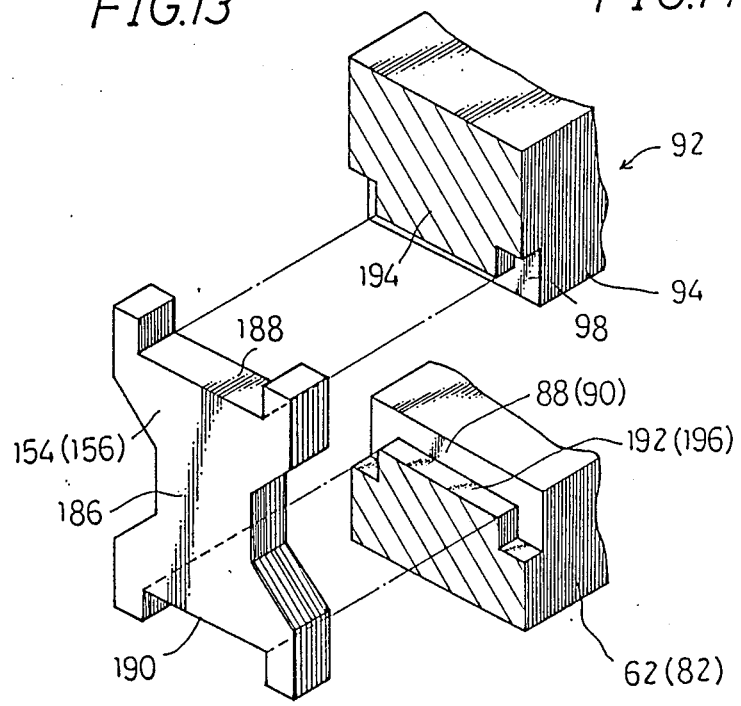
FIG. 15 is an exploded perspective view of a further modification of FIG. 12.
Figure 16:
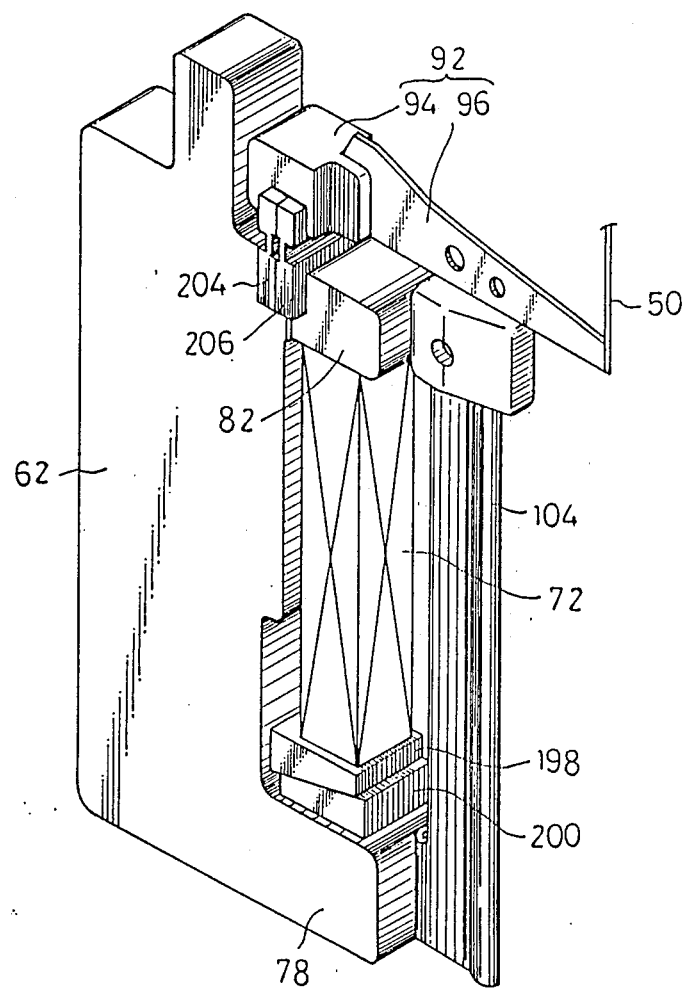
FIG. 16 is a perspective view of a modification of the printing unit.
Figure 17:
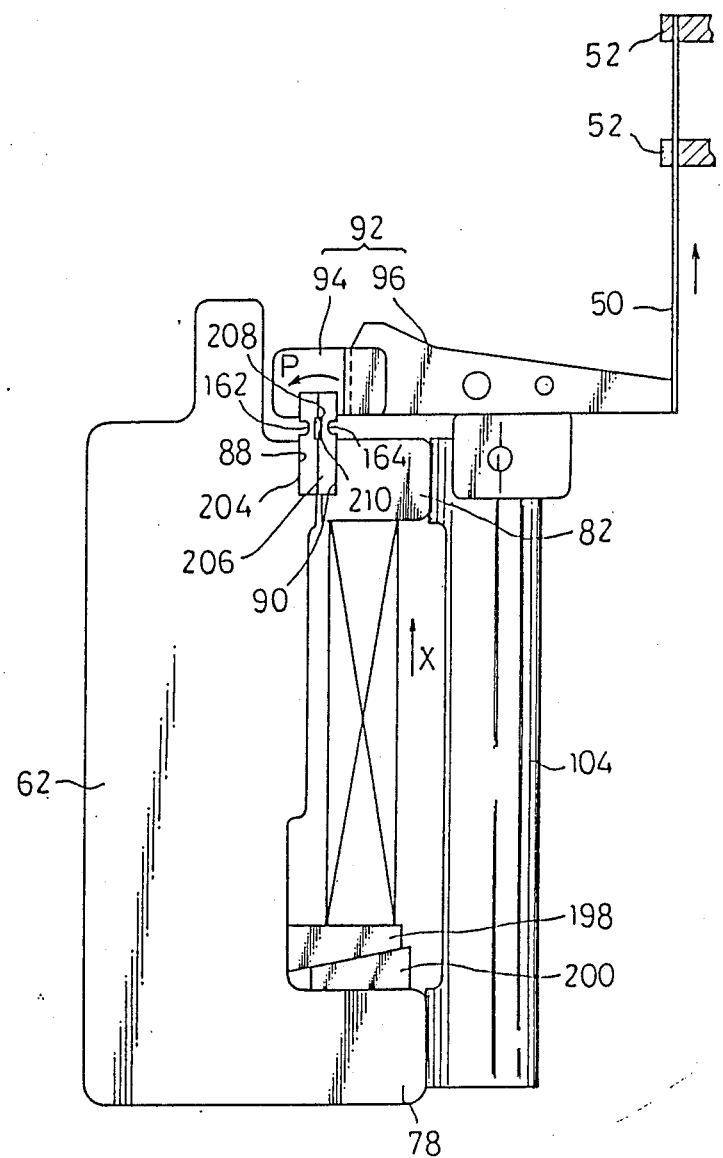
FIG. 17 is an elevational view of FIG. 16.
Figure 18:
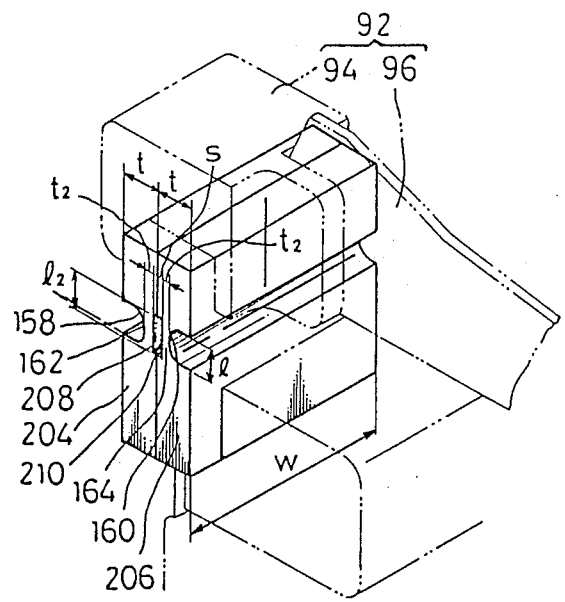
FIG. 18 is a perspective view of the leaf springs shown in FIG. 16.

Referring to FIG. 15 which shows a further modification, the first and second leaf springs 154 and 156 have a uniform thickness, but have a reduced width at their intermediate portions 186. Further, each leaf spring 154(156) is formed at its upper and lower fixed ends with recesses 188 and 190 to be engaged with projections 194 of the base portion 94 of the rolling member 92 and projections 192 and 196 of the frame 62 and the movable member 82, respectively. With this arrangement, the first and second leaf springs 154 and 156 are positioned at their fixed end portions to the groove 98 of the rolling member 92, the mounting surface 98 of the frame 62 and the mounting surface 90 of the movable member 82, and are fixed by brazing thereto. Further, as each leaf spring has the intermediate small-width portions 186, the stress may be prevented from being concentrated at the fixed edge of each leaf spring.

In the first and second preferred embodiments as mentioned above, the first and second leaf springs 84 and 86 or 154 and 156 are so arranged as to extend in parallel to the displacement direction of the piezoelectric element 72 under the condition where the facing surfaces of each leaf spring are in contact with each other. Upon expansion of the piezoelectric element 72, the movable member 82 is displaced to upwardly move the leaf spring 86(156) fixed to the movable member 82 in such a manner as to slidingly contact the leaf spring 84(154) fixed to the frame 62. At the same time, both the leaf springs 84 and 86 (154 and 156) are elastically deformed. In such a structure, the leaf springs 84 and 86 (154 and 156) are installed into the groove 98 of the base portion 94 of the rolling member 92 in such a manner that the lower ends of the leaf springs tend to be curved outwardly. Further, the leaf spring 86(156) is fixed to one side surface of the movable member 82. As a result, it was realized in the experiment that the deformable portions of the leaf springs are wavingly slid with a large frictional force, causing a possibility of wear or seizure of the leaf springs.

FIGS. 16 to 22 show a third preferred embodiment intended to reduce such large friction at the deformable portions of the leaf springs contacting with each other and thereby prevent the wear or seizure of the leaf springs.

Referring to FIGS. 16 to 19 which show an example of the third preferred embodiment, a pair of upper and lower wedge members 198 and 200 are interposed between the lower end surface of the piezoelectric element 72 and the upper end surface of the base portion 78 of the frame 62. Both the wedge members 198 and 200 are formed of a material such as zinc having a linear expansion characteristic contrary to that of the piezoelectric element 72, so that the expansion and contraction of the piezoelectric element 72 due to a temperature change may be compensated by the contraction and expansion of the wedge members 198 and 200 to thereby maintain constant the height of the piezoelectric element 72 from the upper end surface of the base portion 78 of the frame 62.

Similar to the previous preferred embodiments, the first and second leaf springs 204 and 206 contacting with each other are formed with U-shaped grooves 158 and 160 to form thin-walled portions (deformable portions) 162 and 164, respectively. The thin-walled portions 162 and 164 are readily deformable.

The opposed surfaces of the deformable portions 162 and 164 of the leaf springs 204 and 206 are formed with recessed portions 208 and 210 for hindering intercontact between the deformable portions 162 and 164. The recessed portions 208 and 210 extend across the width of the leaf springs 204 and 206 on the opposite side of the grooves 158 and 160, thus defining a rectangular cavity between the deformable portions 162 and 164.

When the second leaf spring 206 fixed to the movable member 82 is upwardly moved along the first leaf spring 204 fixed to the frame 62, and the deformable portions of the leaf springs 204 and 206 are elastically deformed, the frictional force to be generated between the deformable portions is reduced by the provision of the recessed portions 208 and 210. Accordingly, it is possible to prevent the generation of wear or seizure between the deformable portions 162 and 164 and well transmit the displacement of the movable member 82 in receipt of the expansion of the piezoelectric element 72. As a result, both the leaf springs 204 and 206 are deformed duly by a given quantity at the deformable portions 162 and 164, respectively. Accordingly, the rolling member 92 is rolled by a given angle to thereby greatly magnify the expansion of the piezoelectric element 72 and transmit the magnified expansion to the printing wire 50.

Figure 19:
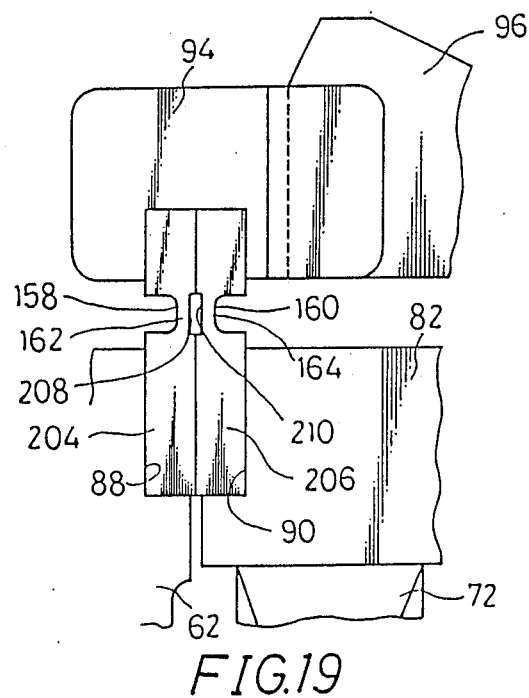
FIG. 19 is an elevational view of FIG. 18.

The inventors have investigated to compare the natural frequencies of the movable portion consisting of the leaf springs 154 and 156 and the rolling member 92 shown in FIG. 12 and the movable portion consisting of the leaf springs 204 and 206 and the rolling member 92 shown in FIG. 19, and also compare the strokes of the printing wire 50 between FIG. 12 and FIG. 19. The results of comparison is shown in Table 3.

TABLE 3

|  | W (mm) | t (mm) | l (mm) | t2 (mm) | S (mm) | l2 (mm) | N (KHz) | P (μm) |
|---|---|---|---|---|---|---|---|---|
| Example of FIG. 19 | 4.0 | 0.8 | 1.0 | 0.2 | 0.2 | 1.2 | 2.1 | 380 |
| Example of FIG. 12 | 4.0 | 0.8 | 1.0 | 0.27 | — | — | 2.7 | 227 |

Where W and t stand for a width and a thickness of the leaf spring, respectively; l and t2 stand for a length and a wall thickness of the deformable portion, respectively; S and l2 stand for a spacing and a length of the cavity defined by the recessed portion; and N and P stand for the natural frequency and the stroke of the wire 50. The leaf springs 154 and 156 were used in the test under an initial condition where seizure and wear have not yet been generated.

As apparent from Table 3, since the deformable portions 162 and 164 of the leaf springs 204 and 206 shown in FIG. 19 are formed with the recessed portions 208 and 210 defining a cavity with a spacing of 0.2 mm, a frictional force between the facing surfaces of the deformable portions 162 and 164 may be greatly reduced to thereby increase the displacement magnification rate (a percentage of the stroke of the printing wire 50 relative to the expansion quantity of the piezoelectric element 72). As a result, the seizure and wear to be generated between the facing surfaces of the deformable portions 162 and 164 may be prevented to maintain the increased magnification rate for a long period of time.

It is noted that each dimension shown in Table 3 is merely exemplary, and it may be modified to arbitral value as shown in Table 4 corresponding to the following Examples 1 to 4.

In Example 1, the spacing S of the cavity defined by the deformable portions 208 and 210 was set to 0.6 mm, and the length of the cavity was set to 1.0 mm. The other dimensions were identical with those of Example shown in FIG. 19.

Figure 20:
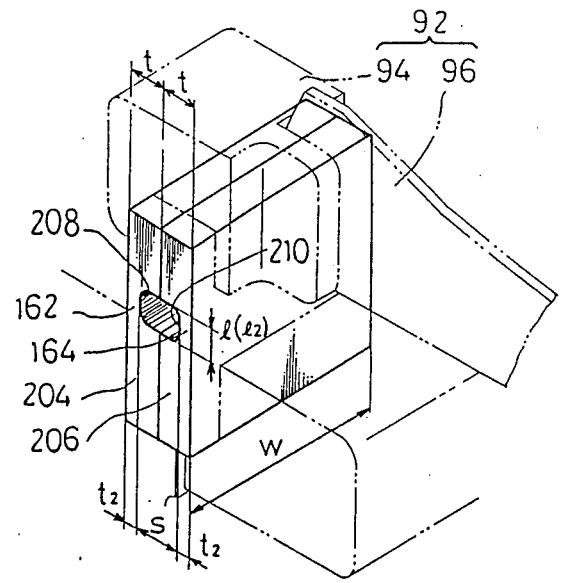
FIG. 20 is a perspective view of a modification of FIG. 18.

In Example 2 shown in FIG. 20, the deformable portions 162 and 164 of the leaf springs 204 and 206 have no grooves on opposite side surfaces thereof so as to increase the spacing S of the cavity defined by the recessed portions 208 and 210.

Figure 21:
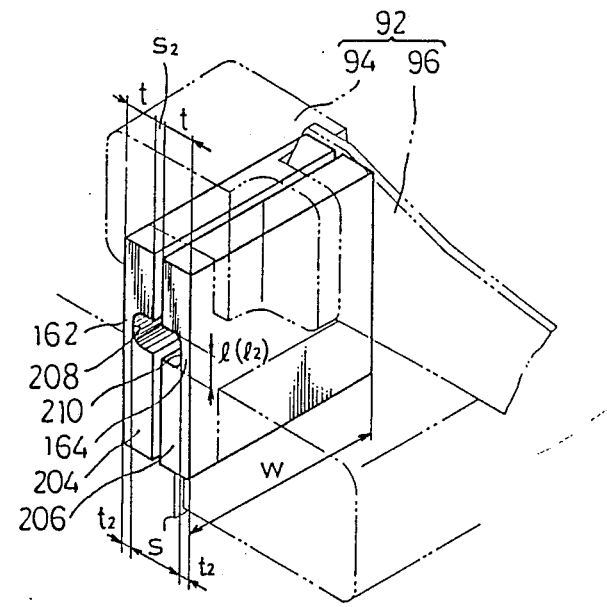
FIG. 21 is a perspective view of another modification of FIG. 18.

In Example 3 shown in FIG. 21, the structure is similar to that of Example 2 except that a small spacing S2 is defined between the facing surfaces of the leaf springs 204 and 206.

Figure 22:
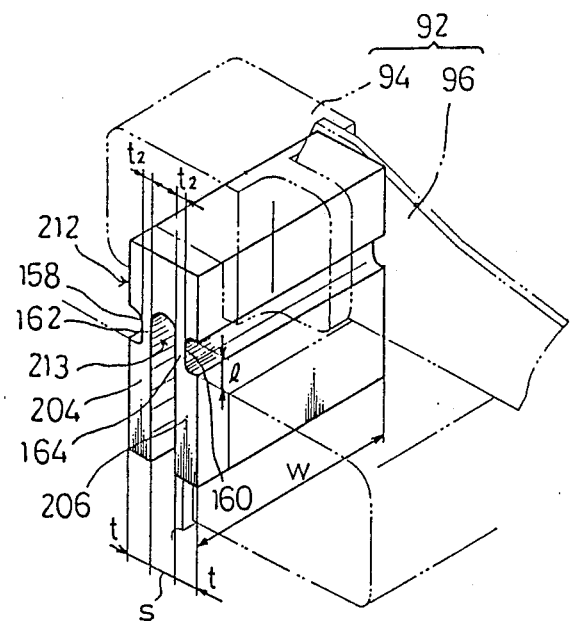
FIG. 22 is a perspective view of a further modification of FIG. 18.

In Example 4 shown in FIG. 22, a single leaf spring 212 is provided to be formed with a vertically extending U-shaped groove 213 at a laterally central portion thereof to result in the formation of a pair of leaf spring portions 204 and 206. The U-shaped groove 213 functions as the cavity mentioned in the previous Examples 1 to 3. Table 4 shows the comparison among the above Examples 1 to 4.

TABLE 4

|  | W (mm) | t (mm) | l (mm) | t2 (mm) | S (mm) | l2 (mm) | S2 (mm) | N (KHz) | P (μm) |
|---|---|---|---|---|---|---|---|---|---|
| Example 1 | 4.0 | 0.8 | 1.0 | 0.2 | 0.6 | 1.0 | — | 2.4 | 330 |
| Example 2 | 4.0 | 0.8 | 1.0 | 0.27 | 1.06 | 1.0 | — | 4.2 | 210 |
| Example 3 | 4.0 | 0.6 | 1.0 | 0.2 | 1.0 | 1.0 | 0.2 | 3.5 | 250 |
| Example 4 | 4.0 | 0.5 | 1.0 | 0.2 | 0.6 | — | — | 2.4 | 330 |

As apparent from Tables 3 and 4, the displacement magnification rate in Example shown in FIG. 19, Example 1 and Example 4 is increased in comparison with that in Example shown in FIG. 12.

In Example shown in FIG. 12, the spacing S is reduced to be zero so as to increase the magnification rate in accordance with a principle of lever. However, a load to be applied to the piezoelectric element 72 is increased to suppress the expansion of the piezoelectric element 72, resulting in limitation of the stroke of the printing wire. To the contrary, in Example shown in FIG. 19, Example 1 and Example 4, a distance between the center of the thickness of the deformable portion 162 and the center of the thickness of the deformable portion 164 is set to 0.4–0.8 mm, so that although the magnification rate is just reduced, the load to be applied to the piezoelectric element 72 is reduced. Accordingly, it is considered that a large stroke of the printing wire could be obtained.

However, in the case that the distance between the centers of the thickness is further increased as in Examples 2 and 3, the magnification rate is affected to be reduced, and the stroke tends to be suppressed.

As to the natural frequency, an increase in the natural frequency contributes to an increase in a return speed of the rolling member 92, resulting in an improvement in a printing speed of the printing head. Although the natural frequencies in Examples 1 and 4 are smaller than those in Examples 2 and 3, Examples 1 and 4 are preferred from the viewpoint of the stroke of the printing wire.

In the foregoing preferred embodiments, the frame 62 and the movable member 82 are formed independently. In mounting the piezoelectric element 72, the movable member 82 is positioned through the leaf springs 84 and 86 (154 and 156 or 204 and 206) and the connecting member 104 relative to the frame 62, and then the piezoelectric element 72 is fixedly interposed between the movable member 82 and the base portion 78 of the frame 62. In connection with this, it is desirable to provide an accurate dimension and a high degree of parallelism between the movable member 82 and the base portion 78 of the frame 62. That is, a less error of installation of the movable member 82 is desired.

FIGS. 23 to 26 show a method of producing the printing unit which improves the accuracy of dimension and the degree of parallelism between the movable member 82 and the base portion 78 of the frame 62 by way of an example in accordance with the present invention.

Figure 23:
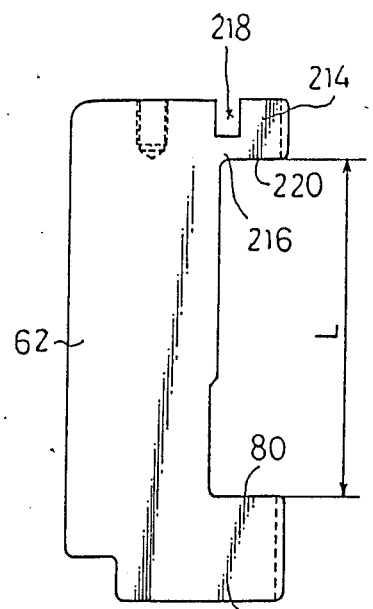
FIGS. 23 to 26 are elevational views of the printing unit, illustrating each step of the producing method according to the present invention.
Figure 24:
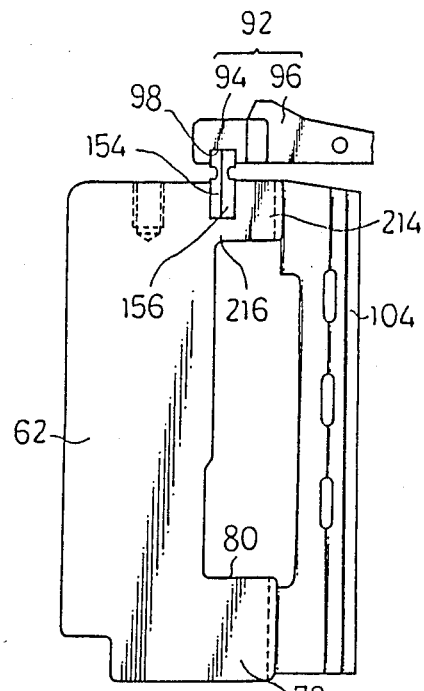
Figure 25:
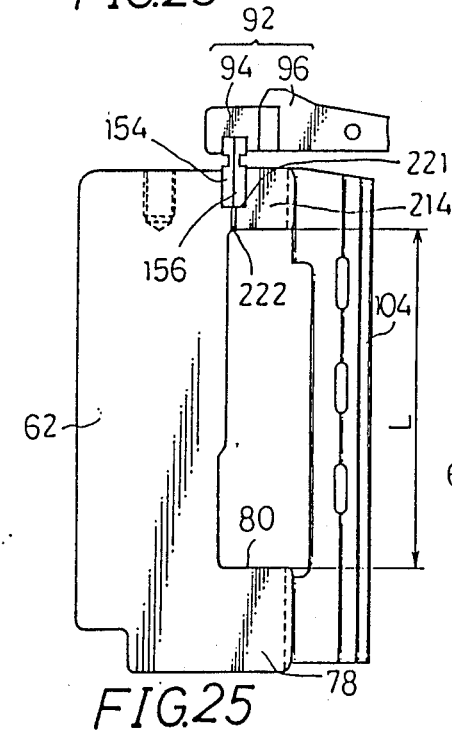
Figure 26:
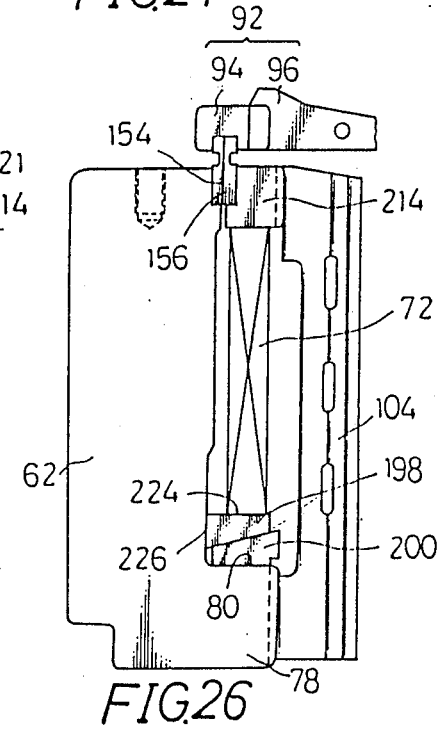

Referring to FIG. 23, the frame 62 is formed from a rectangular metal plate having a given thickness extending in a direction substantially parallel to the piezoelectric element 72. The frame 62 is formed at its lower end portion with the laterally projecting base portion 78 for supporting the lower end of the piezoelectric element 72 through the pair of wedge members 198 and 200. Further, the frame 62 is integrally formed at its upper end portion with a movable member 214 connected through a connecting portion 216. Thus, the movable member 214 is spaced a distance L from the base portion 78 so as to insert the piezoelectric element 72 and the wedge members 198 and 200. A recess 218 is defined between the frame 62 and the movable member 214 so as to insert the base portions of the leaf springs 154 and 156 by press working, for example.

The upper surface 80 of the base portion 78 of the frame 62 and the lower surface 220 of the movable member 214 are finished as required so as to further improve the accuracy of the distance L and the degree of parallelism.

After the frame 62 and the movable member 214 are formed as mentioned above, the upper end portions of the leaf springs 154 and 156 are inserted into the groove 98 of the base member 94 of the rolling member 92, and are fixed by brazing thereto. Then, the base portions of the leaf springs 154 and 156 fixed to the base member 94 are inserted into the recess 218, and are fixed by brazing to the inner wall surface of the recess 218. Under the condition, the leaf springs 154 and 156 are elastically deformably contacted with each other.

Then, the connecting member 104 adapted to be elastically displaced in a direction parallel to the displacement direction of the piezoelectric element 72 is provided between the movable member 214 and the base portion 78 of the frame 62 in such a manner that the upper end portion of the connecting member 104 is fixed to the side surface of the movable member 214, while the lower end portion is fixed to the side surface of the base portion 78. In this embodiment, a sectional area at the end portions of the connecting member 104 to be fixed to the movable member 214 and the frame 62 are larger than a sectional area at an intermediate portion between the fixed end portions, by forming three elongated holes at the intermediate portion, so that the connecting member 104 may be more readily expanded and contracted in receipt of the displacement of the piezoelectric element 72.

After the leaf springs 154 and 156 and the supporting member 104 are mounted as mentioned above, a separation slit 222 is formed into the connecting portion 220 from the underside to the bottom of the recess 218, so as to separate the movable member 214 from the frame 62.

Thereafter, the upper wedge member 198 is fixed to the lower end surface of the piezoelectric element 72 by an adhesive, and they are inserted between the movable member 214 and the base portion 78 of the frame 62 until a stopper surface 226 of the upper wedge member 198 abuts against the side surface of the frame 62, and then the upper end surface of the piezoelectric element 72 abuts against the lower surface of the movable member 214. At this time, the upper end surface of the piezoelectric element 72 is bonded by an adhesive to the lower surface of the movable member 214 as required.

Then, the lower wedge member 200 is inserted between the upper wedge member 198 and the base portion 78 of the frame 62, and is beat by a given force, thus completing the installation of the piezoelectric element 72. At this time, the abutting surfaces among the lower wedge member 200, the upper wedge member 198 and the base portion 78 of the frame 62 are coated with an adhesive as required.

In accordance with the above steps, the high accuracy of the distance L (shown in FIG. 25) and the parallelism between the base portion 78 of the frame 62 and the movable member 214 may be ensured. Accordingly, the piezoelectric element 72 and the pair of wedge members 198 and 200 may be closely fitted between the base portion 78 of the frame 62 and the movable member 214, and the movable member 214 may be displaced sufficiently in receipt of the displacement of the piezoelectric element 72. Thus, both the leaf springs 154 and 156 are elastically deformed sufficiently in receipt of the displacement of the movable member 214 to accurately roll the rolling member 92 at a given angle, thereby ensuring good printing operation.

Figures 27, 28:
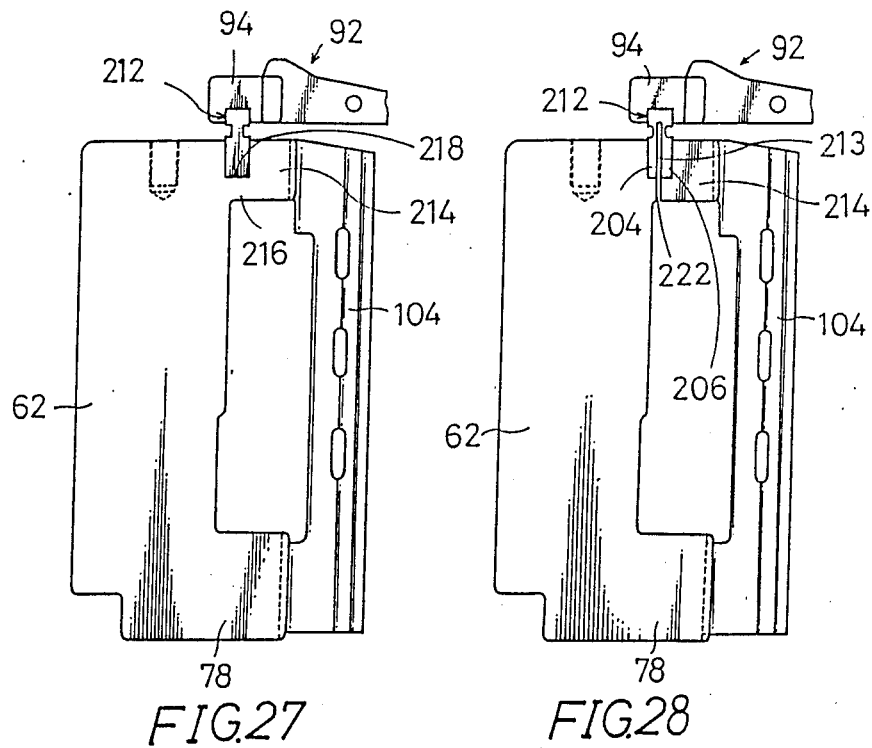
FIGS. 27 and 28 are elevational views similar to FIGS. 23 to 26, illustrating each step of a modification of the producing method according to the present invention.

Referring to FIGS. 27 and 28 which show a modification of the preferred embodiment shown in FIGS. 23 to 26, wherein a single thick leaf spring 212 is formed with a central split groove 213 extending from the separation groove 222 formed at the connecting portion 216.

The printing unit in this case is manufactured in the following manner. That is, as shown in FIG. 27, the movable member 214 is integrally formed at one end of the frame 62 through the connecting portion 216. Then, the single thick leaf spring 212 fixed to the rolling member 92 is inserted into the recess 218 formed between the frame 62 and the movable member 214, and is fixed by brazing to the recess 218.

Thereafter, as shown in FIG. 28, the separation groove 222 is formed in the connecting portion to separate the movable member 214 from the frame 62. Further, the central split groove 213 is formed in the single leaf spring 212 in such a manner as to extend from the separation groove 222, thereby forming a pair of leaf spring members 204 and 206.

According to this example, the high accuracy of the distance and the parallelism between the movable member 214 and the base portion 78 of the frame 62 can be obtained. Moreover, since the single leaf spring 212 is used, the number of parts may be reduced.

Figure 29:
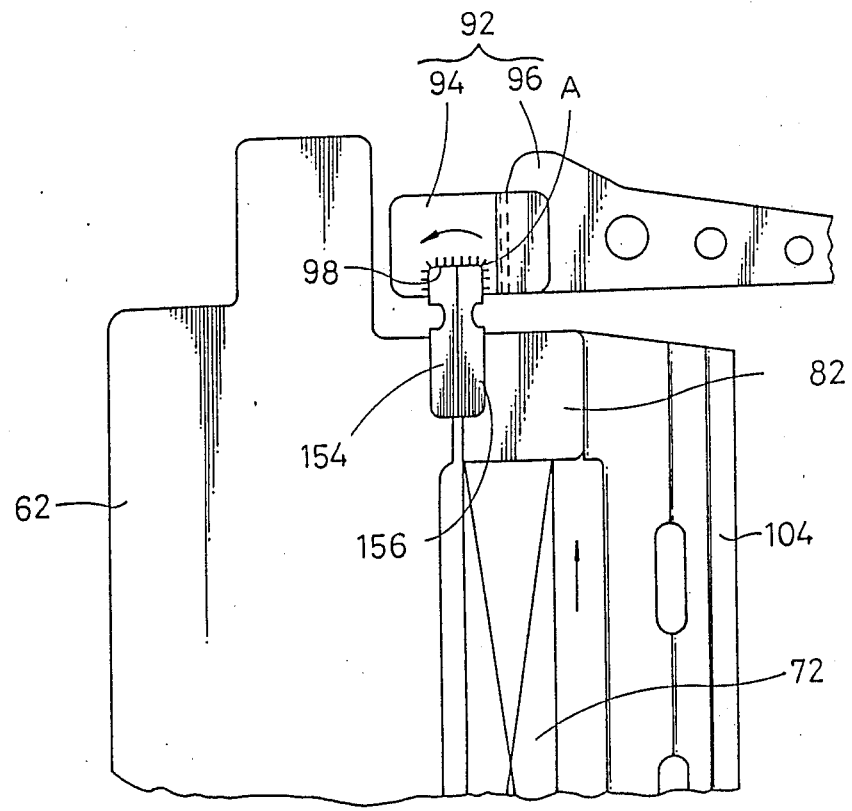
FIG. 29 is a partial elevational view of the essential part of FIG. 10.

In the foregoing some preferred embodiments, the rolling member 92 is so fixed as to ride over the end portions of the pair of leaf springs. In such a structure as shown in FIG. 29, the upper end portions of the leaf springs 154 and 156 are fixed in the recess 98 of the base member 94 of the rolling member 92, and the lower end portions are fixed to the movable member 82 and the frame 62. Upon displacement of the piezoelectric element 72, the deformation of the leaf springs 154 and 156 on the base member 94 side is greater than that on the frame 62 and the movable member 82 side, and a brazed portion A on the inner surface of the recess 98 is subject to a repeated tensile load and compression load. Thereafter, there is a possibility of cracks being generated at the brazed portion A. If the cracks were generated, the leaf springs 154 and 156 would be eventually separated from the base member 94 of the rolling member 92.

Figure 30:
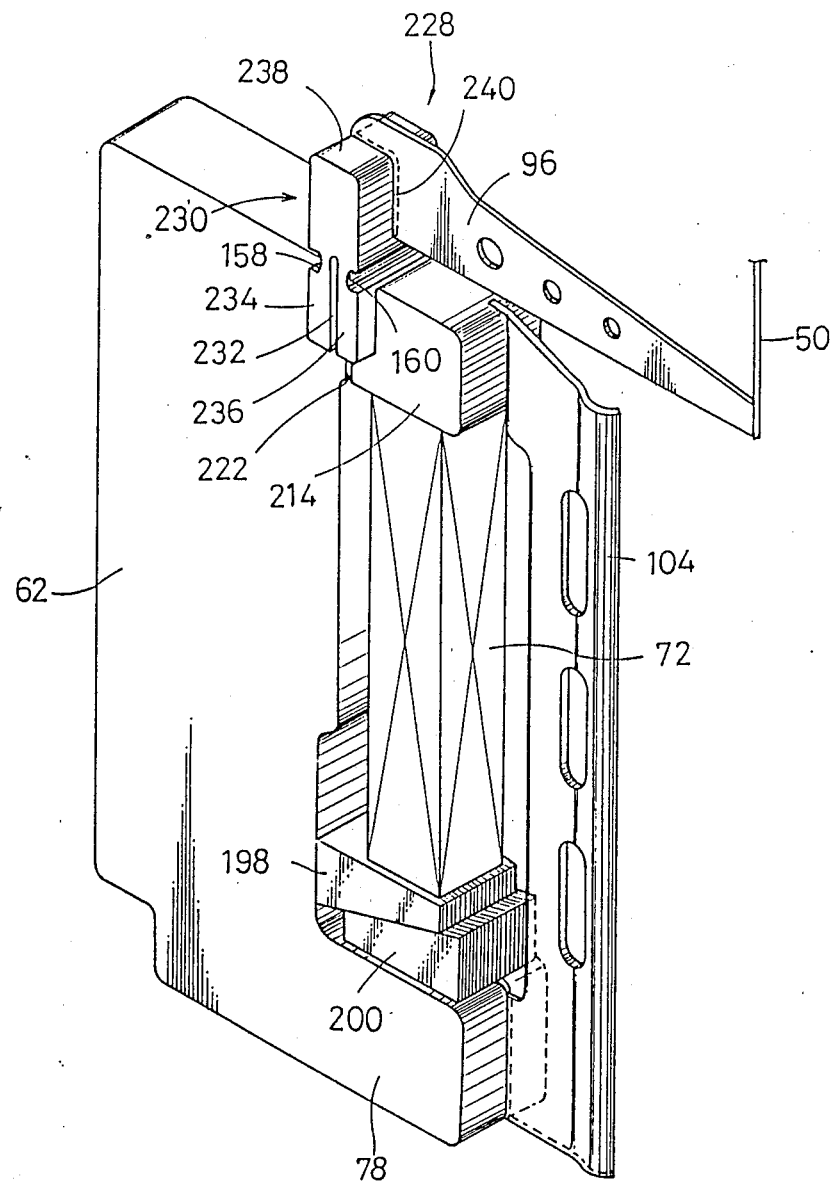
FIG. 30 is a perspective view of a modification of the printing unit.
Figure 31:
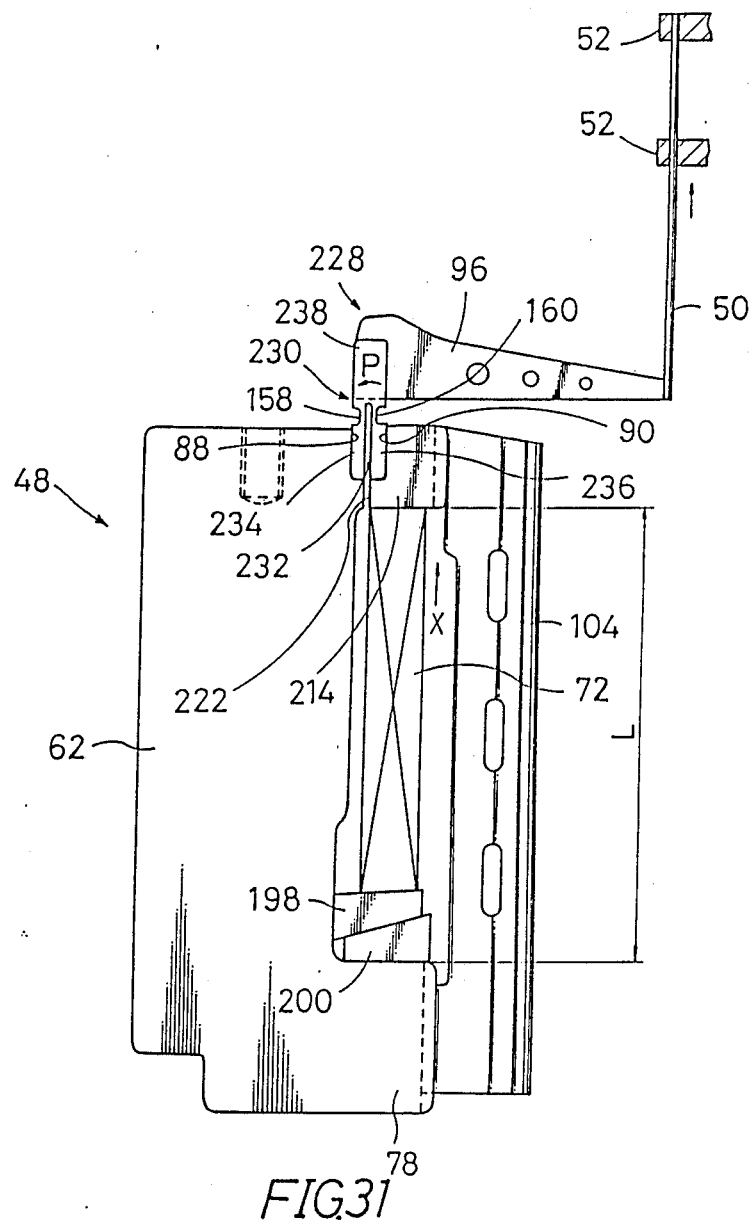
FIG. 31 is an elevational view of FIG. 30.

The following preferred embodiment as shown in FIGS. 30 and 31 is intended to prevent the generation of cracks at the fixing portion between the leaf springs and the rolling member and thereby improve the durability, and also to reduce the number of parts and thereby simplify the structure.

Referring to FIGS. 30 and 31, a single thick spring member 230 is formed with a central split groove 232 to thereby form a pair of leaf springs 234 and 236. Further, a head portion connecting the leaf springs 234 and 236 functions as a rolling base member 238. That is, the pair of split plate portions of the spring member 230 function as the leaf springs 234 and 236, while the head portion of the spring member 230 functions as the rolling base member 238. In other words, the leaf springs 234 and 236 are integrally formed with the rolling base member 238 with no fixed portions.

Figure 32:
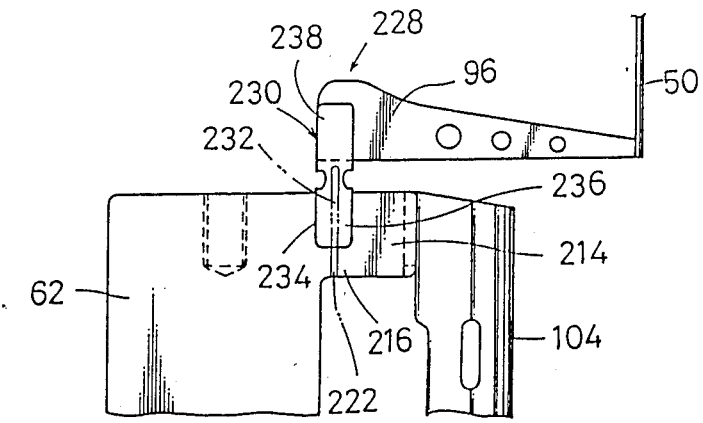
FIG. 32 is a partial elevational view of FIG. 31.

The leaf springs 234 and 236 are fixed by brazing to the spring mounting surfaces 88 and 90 of the frame 62 and the movable member 214. Further, the leaf springs 234 and 236 are formed at their intermediate positions with opposite U-shaped grooves 158 and 160 at which portion the leaf springs are mainly elastically deformed. The head portion 238 is formed with a recess 240 for receiving the wire driving arm 96 of the rolling member 228. Thus, the base end portion of the wire driving arm 96 is inserted into the recess 240, and is fixed by brazing to the recess 240. The printing wire 50 is also fixed by brazing to the tip of the wire driving arm 96. In this embodiment, the frame 62 is formed independently of the movable member 214. In this regard, FIG. 32 shows a modification of the preferred embodiment shown in FIGS. 30 and 31. In the modification shown in FIG. 32, the movable member 214 is integrally formed with the frame 62, so that the high accuracy of the frame 62 and the movable member 214 may be readily attained. After the spring member 230 is installed at the connecting portion 216 between the movable member 214 and the frame 62, the separation groove 222 is formed in the connecting portion 216 to separate the frame 62 and the movable member 214. Further, the central split groove 232 is formed in the spring member 230 in such a manner as to extend from the separation groove 222.

As mentioned above, since the pair of leaf springs 234 and 236 and the rolling base member 238 are integrally formed by the single spring member 230, there is no necessity for fixing (brazing) both the members, resulting in no possibility of the generation of cracks at the brazed portion, thus improving the durability. In addition, the number of parts may be reduced.

Figure 33:
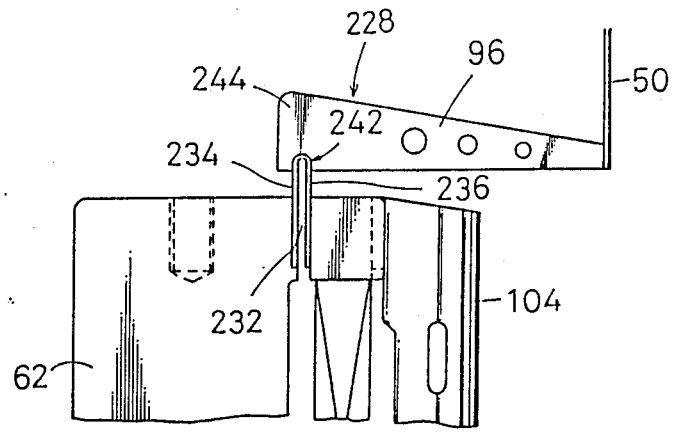
FIG. 33 is a partial elevational view of a modification of FIG. 31.

Referring to FIG. 33 which shows a modification of the above preferred embodiments shown in FIGS. 30 to 32, a spring member 242 is bent in the form of a U-shape to form the pair of leaf springs 234 and 236. A bent portion or a head portion of the spring member 242 is fixed to a base portion 244 (corresponding to the rolling base member) of the rolling member 228 by welding or brazing.

In the displacement magnifying mechanism as mentioned in the foregoing preferred embodiments shown in FIGS. 1 through 33, there is provided the elastically deformable connecting member 104 between the movable member 82 (as in FIG. 10, for example) and the base portion 78 of the frame, so as to maintain parallel displacement of the movable member 82 in receipt of the displacement of the piezoelectric element 72 and thereby prevent lack of the rolling angle of the rolling member 92. In this case, it is necessary to set the elastic force of the connecting member 104 so that it may be fully balanced with the elastic force of the leaf springs 154 and 156. However, it is actually hard to precisely balance both the elastic forces under the dynamic condition of these members.

The following preferred embodiment as shown in FIGS. 34 through 38 intends to prevent the inclination of the movable member 82 more reliably by providing a parallel link mechanism between the movable member 82 and the frame 62.

Figure 34:
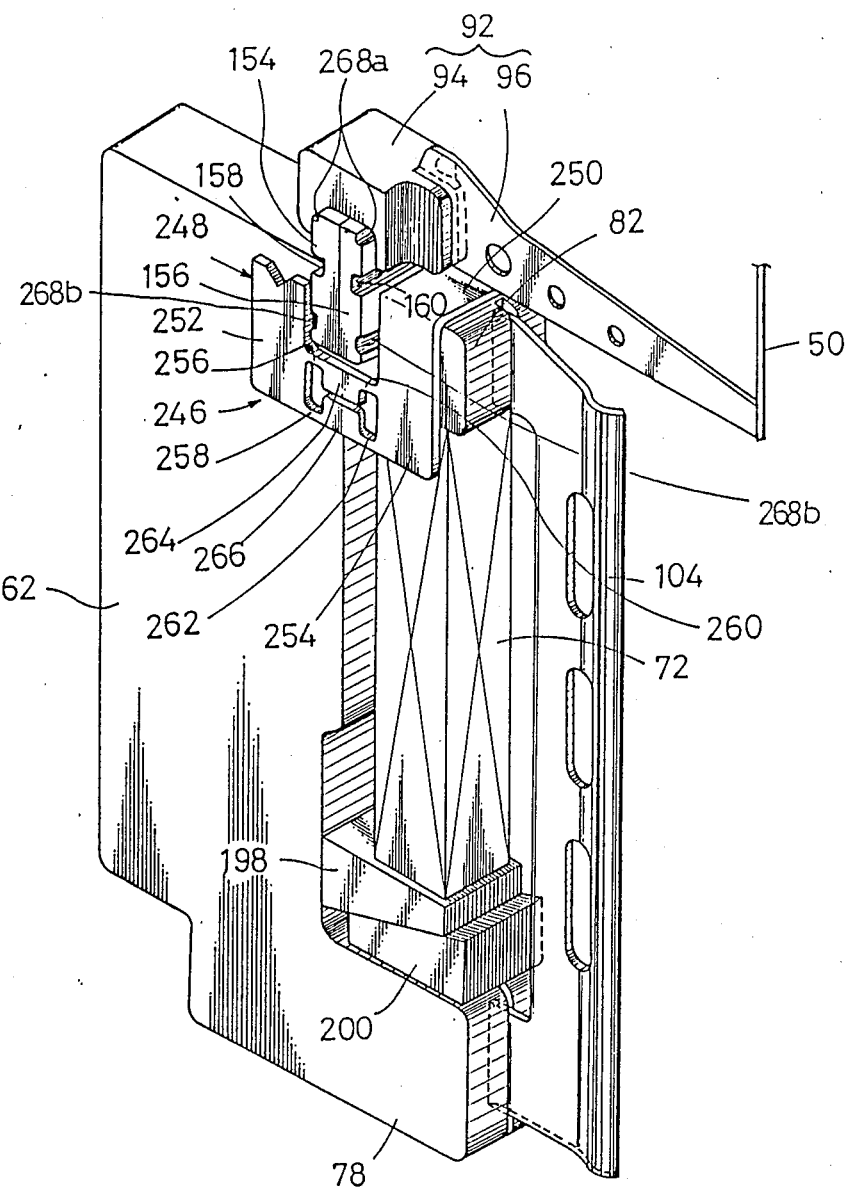
FIG. 34 is a perspective view of a modification of the printing units.
Figures 35, 36:
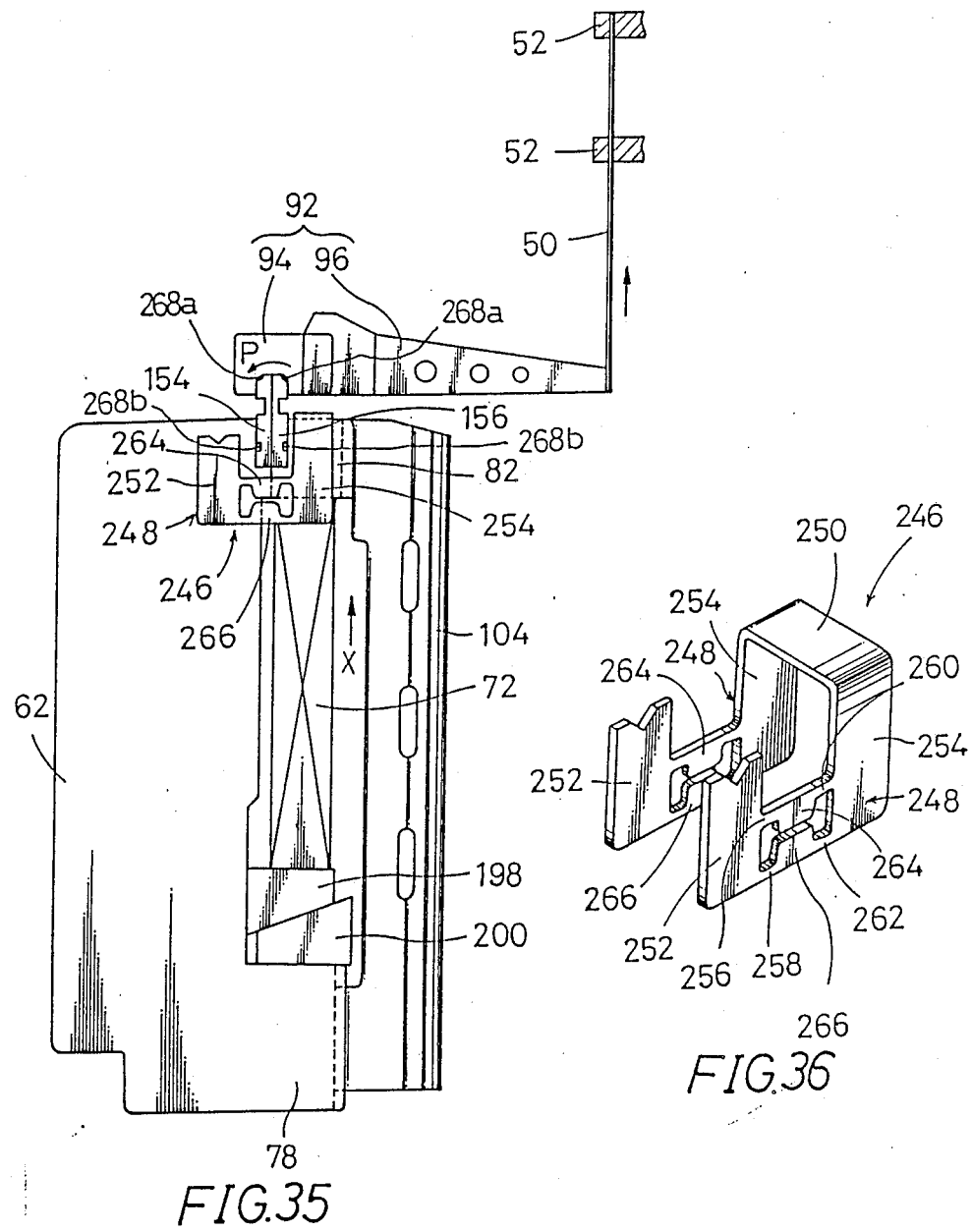
FIG. 35 is an elevational view of FIG. 34.
FIG. 36 is a perspective view of the parallel link mechanism shown in FIG. 34.

Referring first to FIGS. 34 to 36, the construction of the printing unit is similar to the preferred embodiment shown in FIG. 9, for example, except that a parallel link mechanism 246 is provided.

The parallel link mechanism 246 is provided between the frame 62 and the movable member 82 so as to guide the movable member 82 under the condition parallel to the displacement direction of the piezoelectric element 72. As clearly seen in FIG. 36, the parallel link mechanism 246 is formed from an elastically deformable single plate by punching and bending, thus forming a pair of parallel link plates 248 having the same shape and a connecting portion 250 connecting both the link plates 248.

Each of the pair of link plates 248 includes a pair of parallel vertical link portions 252 and 254, a pair of parallel horizontal link portions 264 and 266 and four elastically deformable hinge portions 256, 258, 260 and 262 connecting the vertical link portions 252 and 254 with the horizontal link portions 264 and 266. Thus, the link plate 248 forms a quadri-hinged parallel link.

As shown in FIGS. 34 and 35, the opposed inner surfaces of the left vertical link portions 252 of the link plates 248 are fixed by brazing to both the side surfaces of the frame 62, while the opposed inner surfaces of the right vertical link portions 254 are fixed by brazing to both the side surfaces of the movable member 82 at its intermediate portion. Further, the inner surface of the connecting portion 250 of the link mechanism 246 is fixed to the upper surface of the movable member 82.

In operation, when the piezoelectric element 72 is supplied with voltage, it is expanded by a predetermined length in the direction of the arrow X shown in FIG. 35 to displace the movable member 82 against the load of the connecting member 104, the second leaf spring 156 and the parallel link mechanism 246. Then, the second leaf spring 156 is lifted along the first leaf spring 154 by the displacement force of the movable member 82. As a result, both the leaf springs 154 and 156 are curved like a bimetal to generate a moment in the direction of the arrow P shown in FIG. 35. Accordingly, the rolling member 92 is rolled to advance the printing wire 50. To the contrary, when the voltage applied to the piezoelectric element 72 is removed, the piezoelectric element 72 is contracted to follow the displacement of the movable member 82 and thereby return the rolling member 92 and the printing wire 50 to their original position.

In driving the leaf spring 156 by the movable member 82, the inclination of the movable member 82 due to the load of the leaf spring 156 is suppressed by the connecting member 104 connected to the movable member 82, and it is further suppressed by the parallel link mechanism 246 so fixed as to ride over the movable member 82 and the frame 62. That is, the movement of the movable member 82 is restricted by the link plates 248, and is guided under the condition parallel to the displacement direction of the piezoelectric element 72. Accordingly, it is possible to eliminate lack of elastic deformation of the leaf springs 154 and 156 due to the inclination of the movable member 82, thereby providing a sufficient stroke of the printing wire 50.

The leaf springs 154 and 156 are formed with grooves 158 and 160 to form thin-walled deformable portions similar to the previous preferred embodiments. Additionally, the leaf springs 154 and 156 are formed with upper small grooves 268a and lower small grooves 268b, so as to ensure brazing. That is, upon brazing, rod-like brazing members are inserted into the small grooves 268a and 268b, and the same molten by application of heat is penetrated into a small gap between the contact surfaces among the leaf springs, the movable member and the frame. Then, the brazing material is hardened to complete the bearing.

Figure 37:
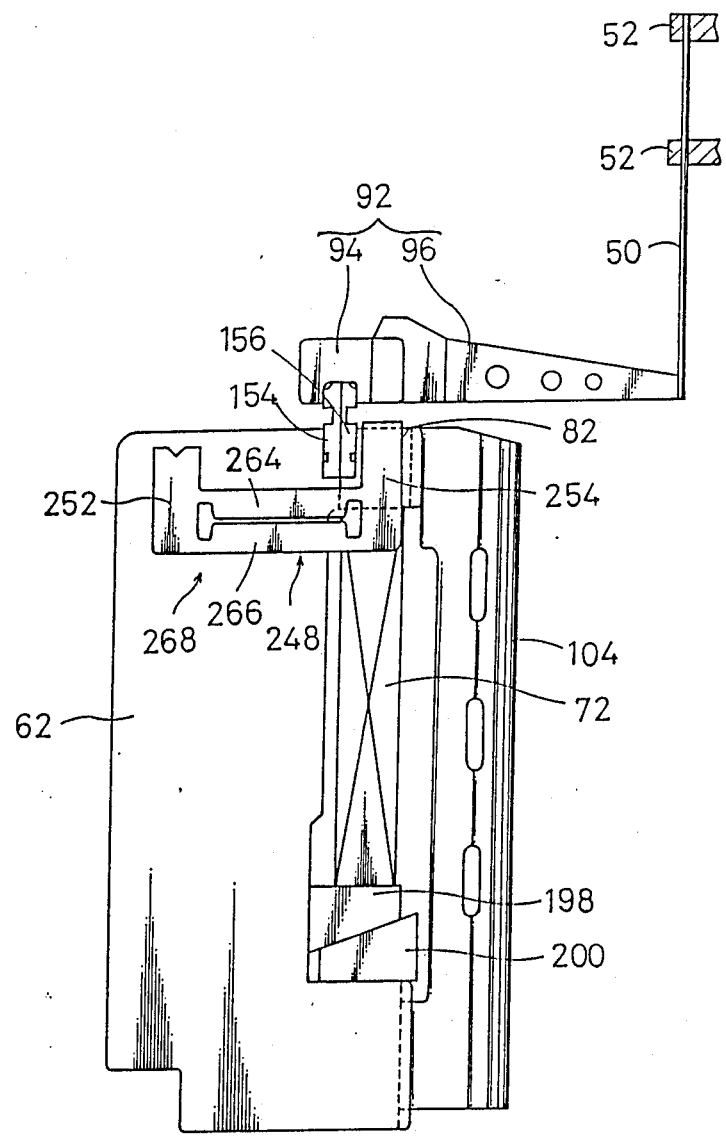
FIG. 37 is an elevational view of a modification of FIG. 34.

Referring to FIG. 37 which shows a modification of the preferred embodiment shown in FIGS. 34 to 36, the horizontal link portions 264 and 266 have a length greater than that in the previous preferred embodiment shown in FIGS. 34 to 36, and the other construction is similar to the previous preferred embodiment. With this arrangement, the displacement of the movable member 82 may be made near a linear displacement in parallel to the displacement of the piezoelectric element 72.

Figure 38:
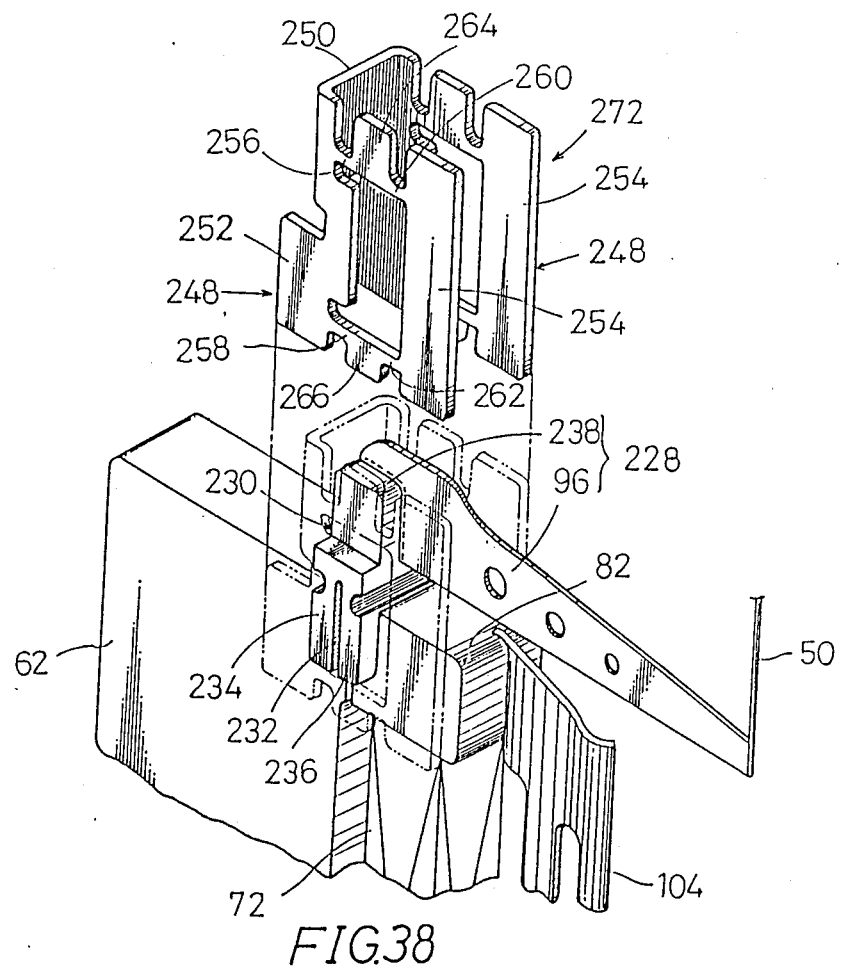
FIG. 38 is an exploded perspective view of the essential part of another modification of FIG. 34.

Referring to FIG. 38 which shows a further modification, the pair of leaf springs 234 and 236 are formed from a single thick spring member 230 by defining the split groove 232, and the head portion of the spring member 230 forms the rolling base member 238 to be fixed to the wire driving arm 96. This construction is substantially the same as that shown in FIG. 30.

Reference numeral 272 designates a parallel link mechanism in this modification. The vertical link portions 252 and 254 extend a fixed length upward from the upper surfaces of the frame 62 and the movable member 82. The vertical link portions 252 are fixed at their lower portion to both the side surfaces of the frame 62, and are integrally connected at their upper portion with each other by a connecting portion 250. In contrast to the constructions of the preferred embodiments shown in FIGS. 34 and 37 wherein the parallel link mechanisms 246 and 268 are located on one side of the leaf springs 154 and 156, the parallel link mechanism 272 shown in FIG. 38 is located in such a manner that the horizontal link portions 264 and 266 ride over the leaf springs 234 and 236, and the distance between the horizontal link portions 264 and 266 is increased.

With this arrangement, the movable member 82 may be more stably displaced in parallel to the displacement direction of the piezoelectric element 72.

In the foregoing preferred embodiments shown in FIGS. 34 to 38, the connecting member 104 may be removed when suitably setting an elastic force of the hinge portions of the parallel link mechanism owing to the elasticity of the hinge portions. Thus, the quick return operation of the movable member 82 and the rolling member 92 may be ensured, and the parallel displacement of the movable member 82 in relation to the piezoelectric element 72 may be also ensured.

Figure 40:
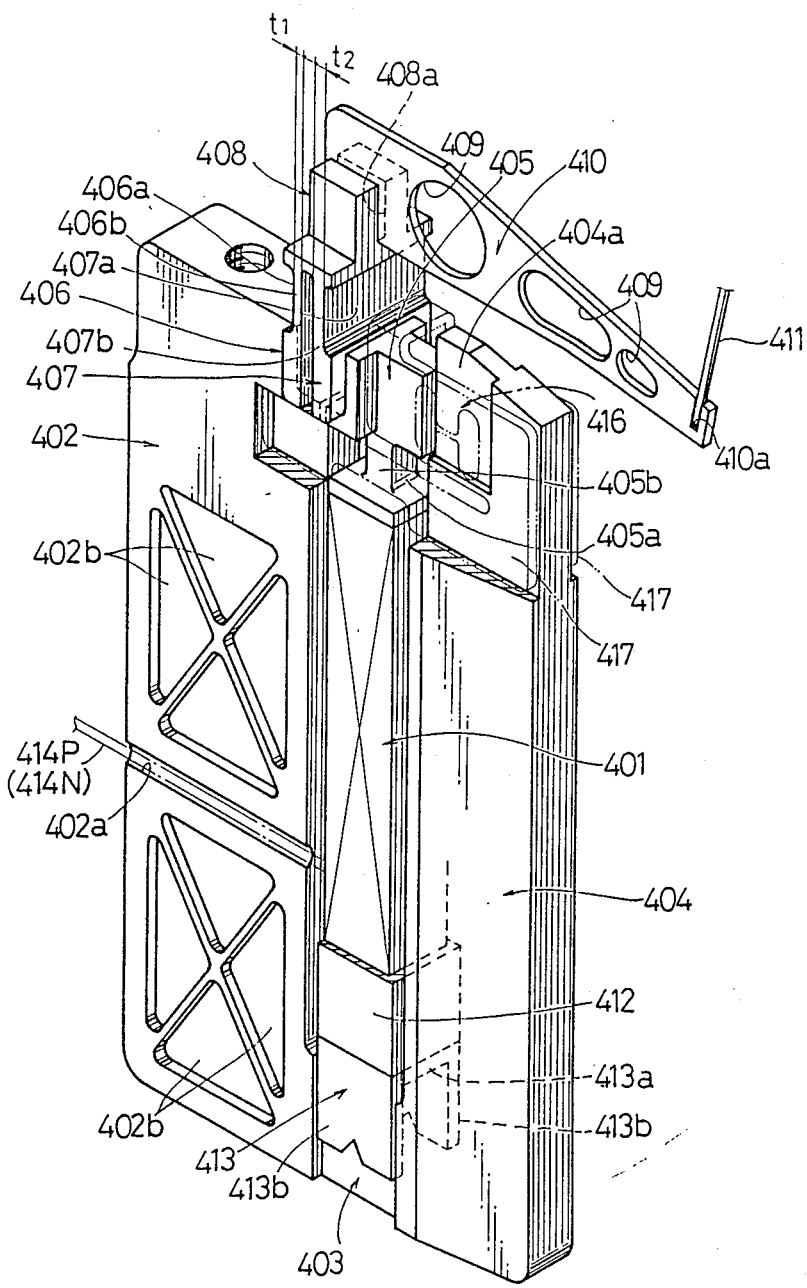
FIG. 40 is a perspective view of a further preferred embodiment of the device for magnifying displacement of a piezoelectric element according to the present invention.
Figure 42:
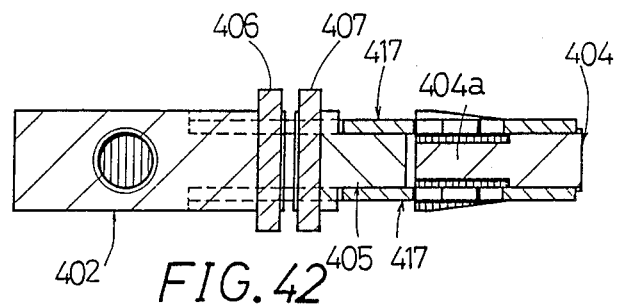
FIG. 42 is a cross section taken along the line III—III in FIG. 41.

Referring to FIGS. 40 and 42 which show a further preferred embodiment of the present invention, reference numeral 401 designates a piezoelectric element formed from a stacked piezoelectric ceramic adapted to be expanded when voltage is applied thereto.

Reference numeral 402 designates a main frame for supporting the piezoelectric element 401. The main frame 402 is formed from a rectangular metal plate having a predetermined thickness, and it is so located as to extend along the piezoelectric element 401. The main frame 402 is formed at its lower end with a lateral projection 403 for supporting a lower end of the piezoelectric element 401 through a temperature compensating member 412 and a preload member 413 (which will be hereinafter described). The main frame 402 is formed on its opposite side surfaces with a pair of guide grooves 402a for guiding a pair of lead wires 414P and 414N and with a plurality of recesses 402b for the purpose of reduction in weight.

A movable member 405 is provided on the upper end of the piezoelectric element 401 in opposed relationship to an upper portion of the main frame 402. A pair of leaf springs 406 and 407 are fixed at their lower portions by brazing to the opposed surfaces of the main frame 402 and the movable member 405, respectively. The leaf springs 406 and 407 have a width greater than the thickness of the main frame 402 and the movable member 405. That is, the leaf springs 406 and 407 project laterally outwardly from the opposite side surfaces of the main frame 402 and the movable member 405. Under the condition, the leaf springs 406 and 407 are brazed to the main frame 402 and the movable member 405, thereby enhancing fixation of the leaf springs 406 and 407 to the main frame 402 and the movable member 405. The leaf springs 406 and 407 are spaced by a predetermined gap, and extend upwardly from the upper end surface of the main frame 402 and the movable member 405. The leaf springs 406 and 407 are connected together at their upper ends to form a rocking block 408. The upper portions of the leaf springs 406 and 407 projecting from the upper end surfaces of the main frame 402 and the movable member 405 are formed on their outside surfaces with a pair of recesses 406a and 407a, thereby forming a pair of thin-walled portions 406b and 407b as an elastically deformable portion. The thin-walled portion 407b has a thickness t2 greater than a thickness t1 of the thin-walled portion 406b, so as to increase an elastic strength of the leaf spring 407 fixed to the movable member 405. Accordingly, buckling and breaking of the leaf spring 407 are positively prevented to improve the durability.

The rocking block 408 is formed with a groove 408a extending in a direction perpendicular to the width of the leaf springs 406 and 407. A rocking arm 410 is inserted at its base portion in the groove 408a, and is fixed by brazing. The rocking arm 410 is formed at its free end with a groove 410a. A printing wire 411 is inserted at its base end in the groove 410a, and is fixed by brazing. The rocking block 408 has a width smaller than the width of the leaf springs 406 and 407, so as to reduce the weight. Further, the rocking arm 410 is formed with a plurality of through-holes 409, so as to reduce the weight.

The lateral projection 403 of the main frame 402 is integrally formed with a sub frame 404. The sub frame 404 extends upwardly from the lateral projection 403 along the piezoelectric element 401 (on the side opposite to the main frame 402) to a position opposed to the movable member 405.

Figure 43:
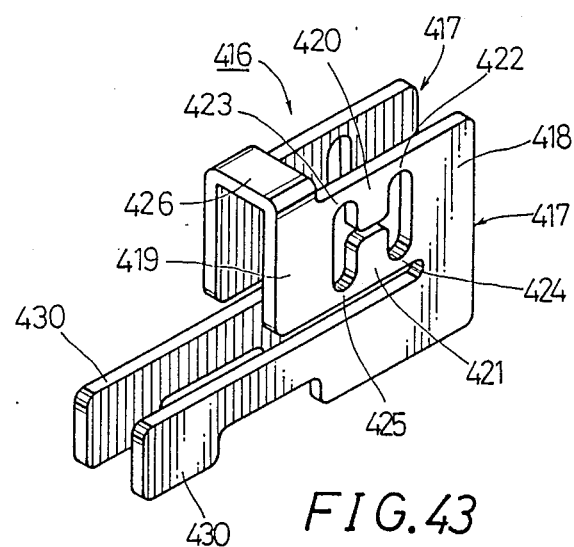
FIG. 43 is a perspective view of a quadri-hinged parallel link mechanism shown in FIG. 40.

A quadri-hinged parallel link mechanism 416 is provided between an upper end portion of the sub frame 404 and the movable member 405, so as to guide the movable member 405 in a direction parallel to the expanding direction of the piezoelectric element 401. As shown in FIG. 43, the quadri-hinged parallel link mechanism 416 is formed by punching and bending a single elastically deformable leaf spring material to form a pair of parallel link plates 417 and a bridge portion 426 bridging the parallel link plates 417.

Each of the parallel link plates 417 is composed of a pair of vertical link portions 418 and 419 extending in parallel to the expanding direction of the piezoelectric element 401, a pair of horizontal link portions 420 and 421 connected between the vertical link portions 418 and 419 through upper hinge portions 422 and 423 and lower hinge portions 424 and 425, thus forming a quadri-hinged parallel link. The vertical link portions 418 of the parallel link plates 417 are fixed by spot welding or the like to opposite side surfaces of the sub frame 404 at its upper end portion, and the vertical link portions 419 of the parallel link plates 417 are fixed by spot welding or the like to opposite side surfaces of the movable member 405. The vertical link portions 419 are connected at their upper ends by the bridge portion 426. The bridge portion 426 is located at a predetermined distance from the upper end surface of the movable member 405.

Figure 41:
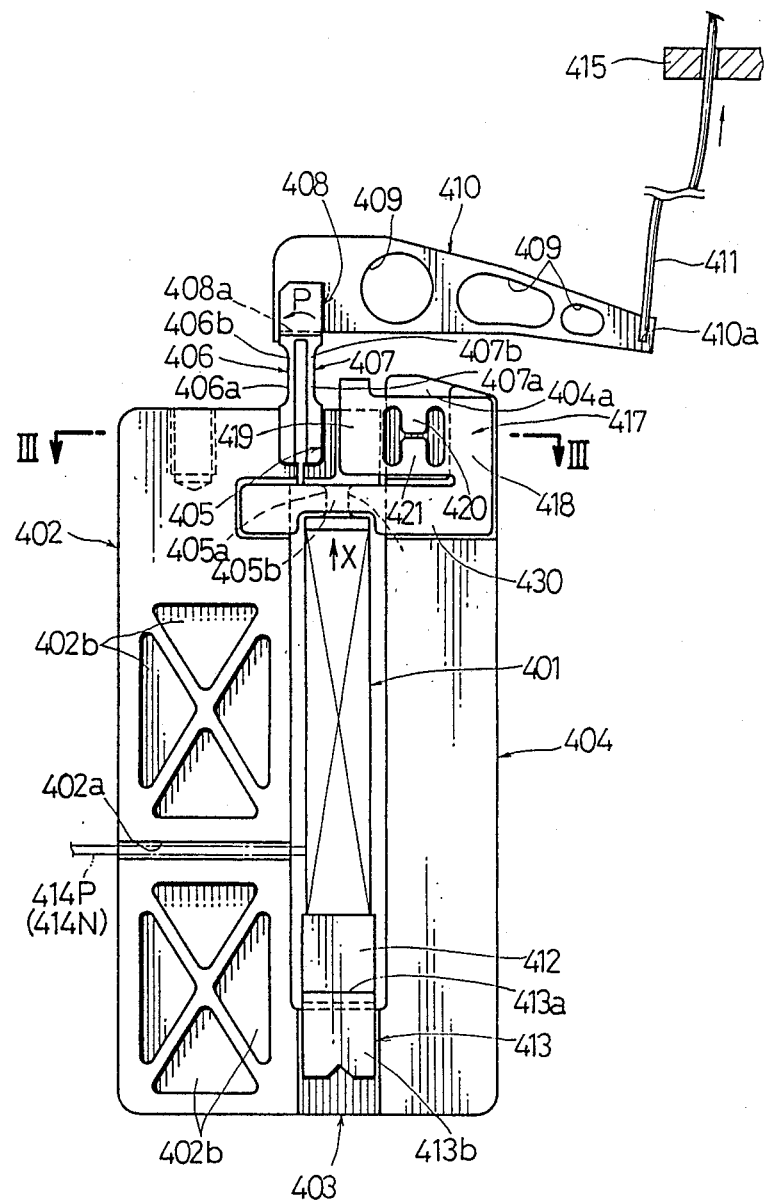
FIG. 41 is a side view of FIG. 40.

As shown in FIG. 43, a pair of parallel connecting plates 430 are integrally connected with the lower ends of the vertical link portions 418 of the parallel link plates 417. Under the mounted condition as shown in FIG. 41, the connecting plates 430 horizontally extend from the opposite side surfaces of the sub frame 404 through the opposite side surfaces of the movable member 405 to the opposite side surfaces of the main frame 402. The connecting plates 430 are fixed by spot welding or the like to the opposite side surfaces of the sub frame 404 and the opposite side surfaces of the main frame 402. Accordingly, the sub frame 404 is maintained in parallel relationship to the main frame 402, and the rigidity of both the frames 402 and 404 can be increased.

The thicknesses of the mounting portions of the main frame 402, the sub frame 404 and the movable member 405 where the link plates 417 and the connecting plates 430 are mounted are reduced by an amount corresponding to the thickness of the plates 417 and 430. Accordingly, the plates 417 and 430 can be mounted within the thicknesses of the main frame 402, the sub frame 404 and the movable member 405, thus contributing to the compactness of the device. Further, as shown in FIG. 42, the thickness of the sub frame 404 at a portion 404a where the horizontal link portions 420 and 421 and the hinge portions 422 to 425 are disposed is reduced so as to prevent these portions 420, 421, 420 to 425 from contacting the opposite side surfaces of the thin-walled portion 404a of the sub frame 404.

After fixing the link plates 417 and the connecting plates 430 to the sub frame 404, the movable member 405 and the main frame 402, the piezoelectric element 401 and the temperature compensating member 412 are mounted between the lateral projection 403 of the main frame 402 and the movable member 405 under the preloaded condition provided by interposing the preload member 413 between the temperature compensating member 412 and the lateral projection 403. The preload member 413 has an inverted U-shaped configuration composed of an upper plate 413a and opposite side plates 413b. In mounting the piezoelectric element 401, the preload member 413 is first vertically movably engaged with the lateral projection 403. The temperature compensating member 412 is previously fixed by adhesive to the lower end surface of the piezoelectric element 401. Then, the lower end surface of the temperature compensating member 412 is brought into contact with the upper surface of the upper plate 413a of the preload member 413. Then, the preload member 413 is upwardly urged to apply a given compression load from the upper end surface of the piezoelectric element 401 to the lower surface of the movable member 405. Under the loaded condition, the opposite side plates 413b of the preload member 413 are fixed by spot welding to the opposite side surfaces of the lateral projection 403.

The temperature compensating member 412 is formed of a material such as zinc or aluminum material having a linear expansion characteristic contrary to that of the piezoelectric element 401. Accordingly, expansion and contraction of the piezoelectric element 401 due to a change in peripheral temperature can be compensated by contraction and expansion of the temperature compensating member 412, thereby maintaining the upper end surface of the piezoelectric element 401 at a constant level.

The contact surfaces between the movable member 405 and the piezoelectric element 401 and the contact surfaces between the temperature compensating member 412 and the preload member 413 may be fixed by adhesive.

As shown in FIG. 41, the movable member 405 is formed at its lower portion with opposite recesses 405a to form an elastic expanding/contracting portion 405b therebetween. The elastic expanding/contracting portion 405b has a rigidity greater than that of the elastic deformable portion 407b of the leaf spring 407, and is adapted to be elastically expanded and contracted by a small amount in the expanding and contracting directions of the piezoelectric element 401. A desired amount of displacement of the movable member 405 due to expansion and contraction of the piezoelectric element 401 is ensured, and when the application of voltage to the piezoelectric element 401 is cut to cause the contraction of the piezoelectric element 401, the elastic expanding/contracting portion 405b of the movable member 405 is slightly expanded by the piezoelectric element 401. Therefore, tensile force applied to the piezoelectric element 401 formed of piezoelectric ceramic can be reduced, thereby preventing damage of the piezoelectric element 401.

In operation, when voltage is applied between both the electrodes of the piezoelectric element 401, the piezoelectric element 401 is expanded by a given length in the direction of stack of the piezoelectric ceramic, that is, in the direction of an arrow X in FIG. 41. As a result, the movable member 405 is displaced, and the leaf spring 407 is urged upwardly along the leaf spring 406 on the main frame 402 side. Accordingly, both the leaf springs 406 and 407 are flexed. Since the leaf spring 406 is flexed more easily than the leaf spring 407, the rocking block 8 integrally formed with the leaf springs 406 and 407 is rocked in a direction depicted by an arrow P in FIG. 41.

In the course of displacement of the movable member 405 caused by the expansion of the piezoelectric element 401, the movable member 405 is guided in parallel to the expanding direction of the piezoelectric element 401 by the link plates 417 of the quadri-hinged parallel link mechanism 416. Therefore, shortage of the amount of flexing of the leaf springs 406 and 407 due to inclination of the movable member 405 can be prevented, thereby rocking the rocking block 408 and the rocking arm 410 to a desired rocking angular position. As a result, the printing wire 411 fixed at the free end of the rocking arm 410 is desirably advanced to a printing medium such as a printing paper (not shown) as being guided by a suitable number of guide members 415 (only one guide member 415 is shown in FIG. 41). Thus, as the leaf spring 407 fixed to the movable member 405 is flexed sufficiently and more largely than the leaf spring 406 fixed to the main frame 402, the rocking arm 410 can be reliably rocked to a desired angular position. Therefore, the expansion of the piezoelectric element 401 is greatly magnified to be transmitted to the printing wire 411, thereby improving the printing quality.

When the application of voltage to the piezoelectric element 401 is cut, the piezoelectric element 401 is contracted to the original condition. As a result, all of the movable member 405, the leaf springs 406 and 407, the rocking block 408 and the rocking arm 410 are returned to their original condition to thereby retract the printing wire 411.

With the above-mentioned construction of the preferred embodiment, it is possible to avoid the interference between the link plates 417 and the leaf springs 406 and 407 since the link plates 417 are located between the movable member 405 and the sub frame 404. Therefore, it is unnecessary to cut the opposite projecting portions of the leaf springs 406 and 407 projecting from the side surfaces of the main frame 402 and the movable member 405.

There will now be described a method of producing the device for magnifying displacement of the piezoelectric element with reference to FIGS. 44 to 47.

Figure 44:
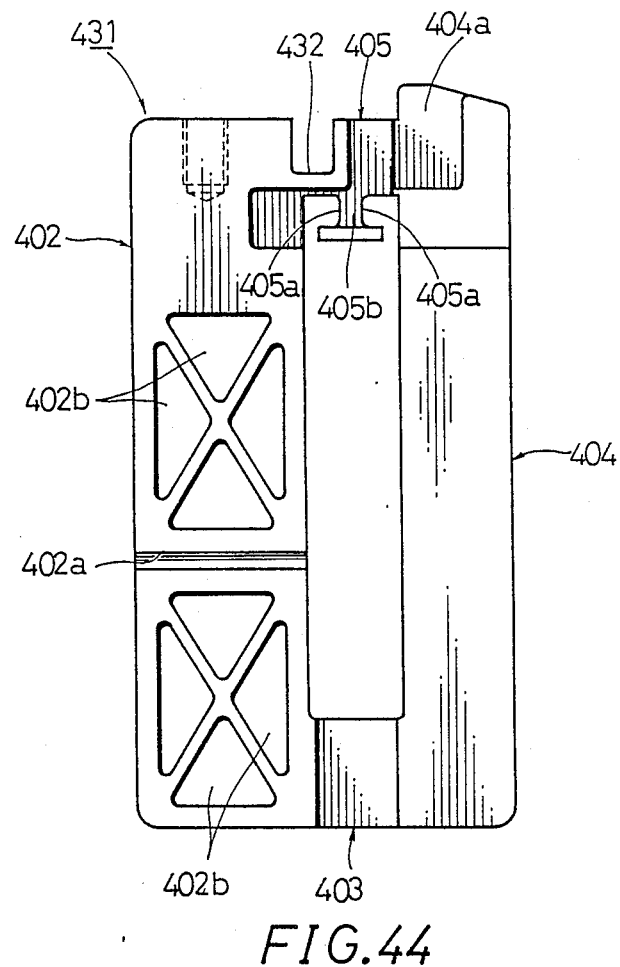
FIG. 44 is a side view of a frame body to be employed in manufacturing the device shown in FIG. 40.

Referring to FIG. 44, a frame body 431 is first formed by injection-molding a mixture of metal powder such as invar alloy or super invar alloy and thermoplastic resin as a binder, heating the molding obtained above at a predetermined temperature (100°-300° C.) to remove a large part of the binder, and sintering the molding in an atmospheric gas at a predetermined temperature (about 1400° C.) of about 80% of a melting point of the metal molding for about one hour.

Specifically, the metal powder as mentioned above is preferably an alloy powder containing about 31 wt % or more of Ni, about 5 wt % or more of Co, and a residual quantity of Fe. As the other constituents, fine quanties of Mn and Cr may be contained. A particle size of the alloy powder is preferably about 4–5 microns. In the sintering step, a residual part (less than 10 vol %) of the binder is removed, and the particles of the alloy powder are bonded together at temperatures ranging from a recrystallizing point and the melting point. In the course of bonding of the particles, the gas having existed among the particles is expelled to form pores in the sintered alloy molding.

Using some samples as shown in Table 5 as obtained by the above method, the inventors have measured a coefficient of thermal expansion and a density.

TABLE 5

| Samples | Alloy Component (wt %) | | | | |
|---|---|---|---|---|---|
| | Fe | Ni | Co | Mn | Cr |
| A | 63.36 | 31.26 | 5.00 | 0.23 | 0.15 |
| B | 63.42 | 31.34 | 4.93 | 0.23 | 0.18 |

In the measurement of the coefficient of thermal expansion, a conventional 32 Ni-5 Co super invar alloy (sample C) and a conventional 36 Ni invar alloy (sample D) which were produced by casting as well as an ingot iron (sample E) were also used as a reference sample. A test result of the measurement of the coefficient of thermal expansion is shown in Table 6.

TABLE 6

| | Coefficient of Thermal Expansion ($\times 10^{-6}/°C.$) Temperature Range (°C.) | | | | |
|---|---|---|---|---|---|
| Samples | −60–20 | 20–100 | 100–150 | 150–200 | 200–250 |
| A | 0.66 | −0.35 | 0.46 | 1.84 | 7.23 |
| B | 0.75 | −0.33 | 0.45 | 1.83 | 7.30 |
| C | 0.74 | 0.52 | 1.31 | — | — |
| D | 1.29 | 1.30 | 1.84 | — | — |
| E | — | 11.70 | — | — | — |

As apparent from Table 6, the samples A and B according to the present invention have a lower coefficient of thermal expansion in each temperature range than the samples C, D and E. That is, the samples A and B have a low thermal expansion characteristic such that they tend not to be affected by a temperature change.

A test result of the measurement of the density is shown in Table 7.

TABLE 7

| Samples | Density (g/cm³) | Relative Density (%) |
|---|---|---|
| A | 7.40 | 89.70 |
| B | 7.50 | 90.91 |
| C | 8.25 | 100 |

As apparent from Table 7, the samples A and B have a lower density than the sample C because the former contain pores therein.

The frame body 431 as manufactured above is integrally formed with the main frame 402, the lateral projection 403, the movable member 405 and the sub frame 404. In the above injection-molding and sintering process, a recess 432 for inserting the leaf springs 406 and 407 is formed. Further, the guide channels 402a for guiding the lead wires to be connected to the piezoelectric element 401 and the recesses 402b for reducing the weight of the main frame 402 are also formed. Further, the mounting portions of the main frame 402, the sub frame 404 and the movable member 405 for mounting the link plates 417 and the connecting plates 430 are reduced in thickness corresponding to the thickness of the plates 417 and 430. Further, the thin-walled portion 404a is formed at an upper, end portion of the sub frame 404 where the hinge portions 422 to 425 and the parallel horizontal portions 420 and 421 are disposed. After the sintering process, the inner surface of the recess 432 and the lower surface of the movable member 405 are finished by machining as required.

On the other hand, an integral piece of the leaf springs 406 and 407 and the rocking block 408 is formed by cutting a metal spring material having a predetermined thickness. The rocking arm 410 is also similarly formed by machining. Then, the rocking arm 410 is inserted into the slit 408a formed in the rocking block 408, and is fixed by brazing thereto. Similarly, the printing wire 411 is inserted into the recess 410a of the rocking arm 410, and is fixed by brazing thereto.

Figure 45:
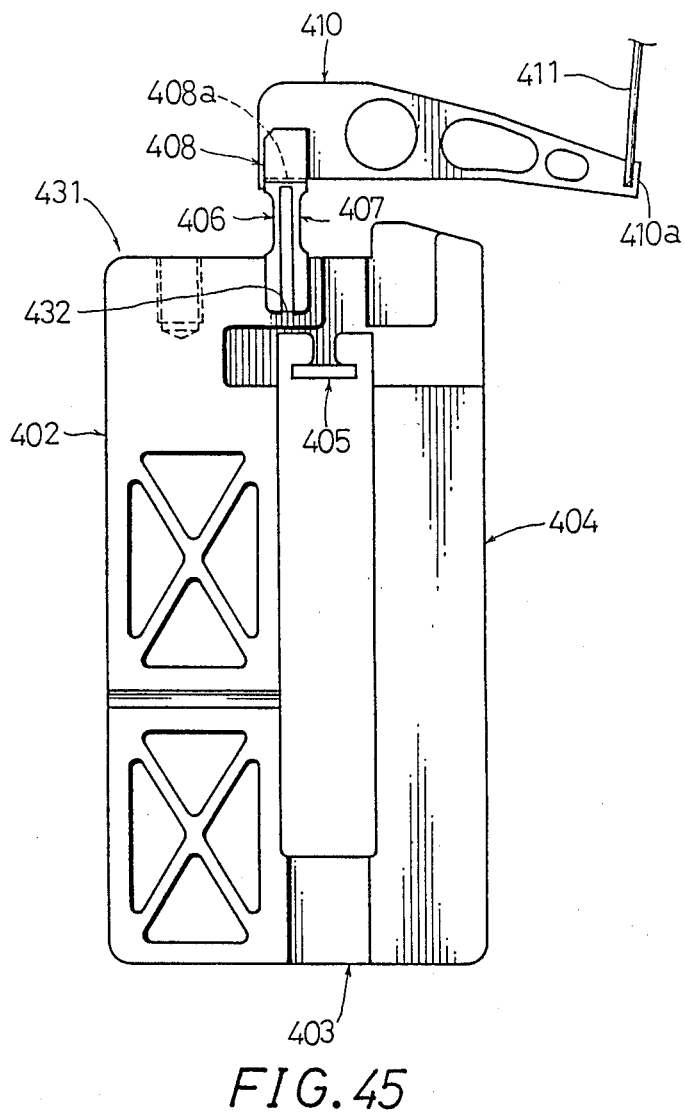
FIG. 45 is a side view of the assembly of the leaf springs with the frame body.

After assembling the leaf springs 406 and 407, the rocking arm 410 and the printing wire 411 as mentioned above, the leaf springs 406 and 407 are inserted into the recess 432, and are fixed by brazing to the inner surface of the recess 432 as shown in FIG. 45.

Figure 46:
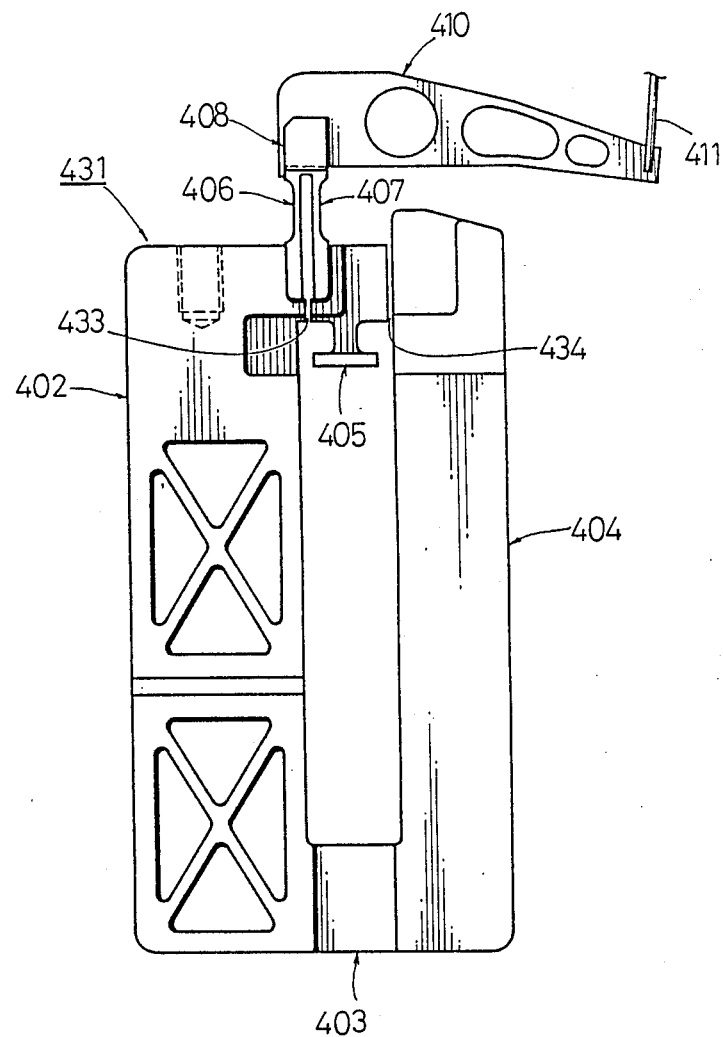
FIG. 46 is a view similar to FIG. 45, illustrating the condition where parting slits for separating the main frame, the movable member and the sub frame from each other.

Then, as shown in FIG. 46, a parting slit 433 is formed between the main frame 402 and the movable member 405, and a parting slit 434 is formed between the movable member 405 and the sub frame 404. These parting slits 433 and 434 are formed by laser cutting, wire cutting or discharge cutting. Thus, the main frame 402, the movable member 405 and the sub frame 404 are separated from one another. It is preferable to apply a silicone rubber or the like as a protection layer onto the outer surface of the leaf springs 406 and 407 before forming the parting slit 433, in order to prevent that a splash (molten chip) to be generated in forming the parting slit 433 by the wire cutting, the laser cutting or the like will be scattered to collide with the leaf springs 406 and 407 and injure the same which will cause promotion of fatigue of the leaf springs 406 and 407. In another aspect, the application of the silicone rubber or the like to the leaf springs 406 and 407 contributes to inhibit the generation of rust because the spring material (e.g., maraging steel) for the leaf springs 406 and 407 tends to be corrosive. The material to be applied to the leaf springs 406 and 407 such as silicone rubber preferably has a softness such that the flexing of the leaf springs 406 and 407 is not hindered, and also has a cohesive property such that the material does not flow in itself.

Figure 47:
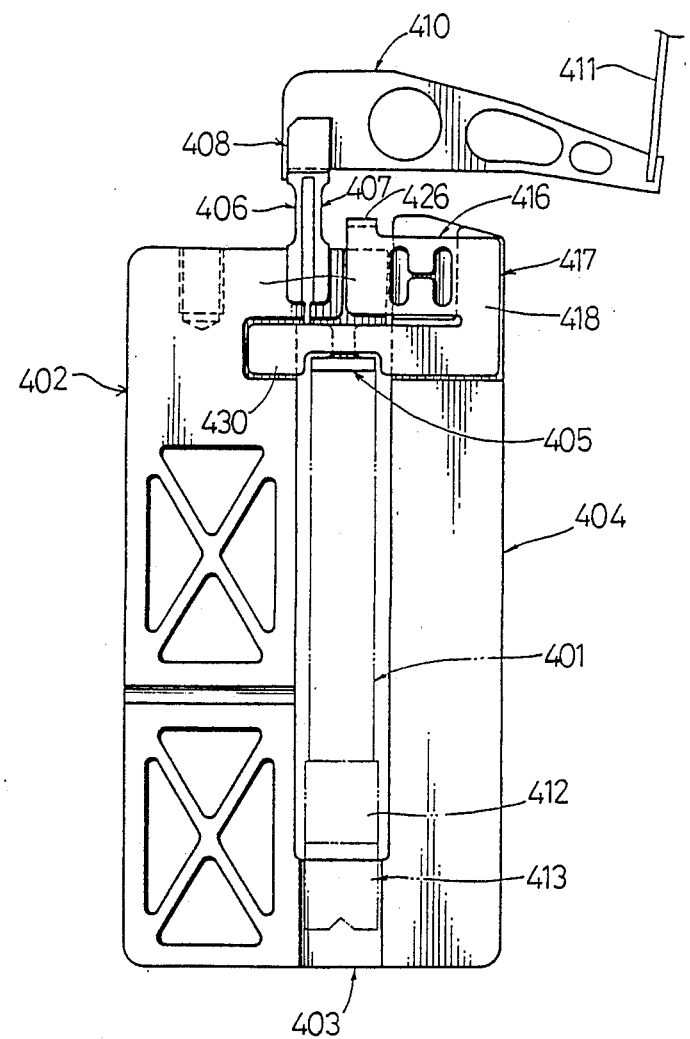
FIG. 47 is a side view illustrating the condition where the quadri-hinged parallel link mechanism is fixed to the movable member and the sub frame.

Then, as shown in FIG. 47, the link plates 417 connected with each other through the bridge portion 426 are so disposed as to cover the opposite side surfaces of the movable member 405 and the sub frame 404. Simultaneously, the connecting plates 430 integral with the link plates 417 are so disposed as to cover the opposite side surfaces of the main frame 402, the movable member 405 and the sub frame 404. Then, the integral piece of the link plates 417 and the connecting plates 430 is properly positioned by means of a positioning tool or the like. Then, the parallel vertical portions 418 of the link plates 417 are fixed to the opposite side surfaces of the sub frame 404, and the other parallel vertical portions 419 of the link plates 417 are fixed to the opposite side surfaces of the movable member 405. Similarly, the connecting plates 430 are fixed to the opposite side surfaces of the main frame 402 and the sub frame 404. Such fixation is carried out by spot welding, laser welding or the like. After fixation of the quadri-hinged parallel link mechanism, it is preferable to apply a silicone rubber or the like onto the link portion of the link mechanism in order to inhibit the generation of rust because the spring material (e.g., maraging steel) for the quadri-hinged parallel link mechanism tends to be corrosive.

Then, the preload member 413 is vertically movably mounted on the upper surface of the lateral projection of the main frame 402. On the other hand, the temperature compensating member 412 is fixed by adhesive to the lower end surface of the piezoelectric element 401. Then, the piezoelectric element 401 fixed with the temperature compensating member 412 is inserted between the upper surface of the preload member 413 and the lower surface of the movable member 405. Prior to insertion of the piezoelectric element 401, adhesive may be applied to the upper surface of the preload member 413 (or the lower surface of the temperature compensating member 412) and the lower surface of the movable member 405 (or the upper surface of the piezoelectric element 401). Then, the preload member 413 is upwardly moved to bring the piezoelectric element 401 into pressure contact with the movable member 405 under a predetermined compression load controlled by measuring the same with use of a load measuring device.

Under the load condition, the opposite side plates 413b of the preload member 413 are fixed to the opposite side surfaces of the lateral projection 403 by spot welding, laser welding or the like. Thus, the device for magnifying displacement of the piezoelectric element is manufactured.

As mentioned above, the main frame 402, the movable member 405 and the sub frame 404 are integrally formed from the frame body 431 by injection-molding and sintering. Therefore, each member can be easily manufactured at low cost.

Further, the main frame 402, the movable member 405 and the sub frame 404 are separated by forming the parting slits 433 and 434 in the frame body 431. Therefore, the highly accurate arrangement of these members can be obtained to thereby ensure high accuracy of the displacement magnifying device.

Further, the predetermined compression load controlled by the load measung device is applied to the piezoelectric element 401 by the preload member 413, and the preload member 413 is fixed to the lateral projection 403 of the main frame 402. Therefore, the predetermined compression load can be accurately applied to the piezoelectric element 401, thereby ensuring sufficient and reliable displacement of the movable member 405 caused by the expansion of the piezoelectric element 401.

Although the frame body 431 is formed by injection-molding and sintering, it may be formed by any other methods such as forging, wiring cutting, laser cutting, machining or in combination therewith.

Having thus described the preferred embodiments of the invention, it should be understood that numerous structural modifications and adaptations may be made without departing from the spirit of the invention.

What is claimed is:

1. A method of producing a device for magnifying displacement of a piezoelectric element adapted to be displaced by application of voltage thereto, said device comprising:
   a frame extending substantially parallel to a direction of displacement of said piezoelectric element;
   a movable member fixed to one end of said piezoelectric element with respect to the direction of displacement;
   a first mount surface formed on said frame and extending substantially parallel to the direction of displacement;
   a second mount surface formed on said movable member and extending substantially parallel to the direction of displacement, said second mount surface being opposed to said first mount surface;
   a first leaf spring mounted at one end portion thereof on said first mount surface and extending substantially parallel to the direction of displacement;
   a second leaf spring mounted at its one end portion on said second mount surface and extending substantially parallel to the direction of displacement; and
   a rolling member fixed to other end portions of said first and second leaf springs, wherein when said piezoelectric element is displaced, said second leaf spring is displaced relative to said first leaf spring through said movable member to roll said rolling member, said method comprising:
   a first step of forming said movable member integrally with said frame through a connecting portion to define a space for inserting therein said piezoelectric element between said movable member and a base portion of said frame;
   a second step of fixing said first and second leaf springs to said frame and said movable member; and
   a third step of forming a separation groove in said connecting portion to separate said movable member from said frame.

2. The method as defined in claim 1, wherein said second step includes fixing said rolling member to said leaf springs.

3. The method as defined in claim 1, wherein said second step includes fixing said leaf springs formed independently of each other to said frame and said movable member.

4. The method as defined in claim 1, wherein said second step includes fixing a single spring member to said frame and said movable member, and said third step includes forming a split groove extending from an end of said spring member on said connecting portion side toward said rolling member to thereby form said first and second leaf springs.

5. A method of producing a device for magnifying displacement of an elongated piezoelectric element adapted to be displaced by application of voltage thereto, comprising:
   a first step of forming an integral frame body having a main frame extending along one side of said piezoelectric element, a supporting portion for supporting one end of said piezoelectric element with respect to a direction of displacement of said piezoelectric element, a movable member mounted on the other end of said piezoelectric element with respect to the direction of displacement of said piezoelectric element, and a sub frame extending along the other side of said piezoelectric element opposite to said main frame;
   a second step of fixing a pair of leaf springs connected at one end with a rocking member to said main frame and said movable member;
   a third step of forming a first parting slit between said main frame and said movable member and a second parting slit between said movable member and said sub frame to separate said main frame, said movable member and said sub frame;
   a fourth step of fixing a quadri-hinged parallel link mechanism between said movable member and said sub frame; and
   a fifth step of fixing said piezoelectric element between said supporting portion and said movable member.

6. The method as defined in claim 5, wherein said first step comprises injection-molding a mixture of metal powder and resin, heating a molding obtained above at a predetermined temperature, and sintering the molding at a predetermined temperature in an atmospheric gas.

7. The method as defined in claim 5, wherein said first step includes formation of a recess for inserting the other end of said leaf springs.

8. The method as defined in claim 5, wherein said first step includes formation of thin-walled portions of said movable member and said sub frame at a position where said quadri-hinged parallel link mechanism is fixed.

9. The method as defined in claim 5 further comprising a step of integrally forming said leaf springs with said rocking member.

10. The method as defined in claim 9 further comprising a step of fixing said rocking member to one end of a rocking arm and fixing the other end of said rocking arm to a printing wire.

11. The method as defined in claim 5, wherein said leaf springs are brazed to said main frame and said movable member.

12. The method as defined in claim 5, wherein said quadri-hinged parallel link mechanism is welded to said movable member and said sub frame.

13. The method as defined in claim 5, wherein said first and second parting slits are formed by laser cutting or wire-cut electrical discharge cutting.

14. The method as defined in claim 5, wherein said quadri-hinged parallel link mechanism comprises a pair of opposed parallel link plates and a bridge portion integrally connecting said parallel link plates, and said fourth step further comprising a step of mounting said parallel link plates on opposite side surfaces of said movable member and opposite side surfaces of said sub frame and a step of positioning said parallel link plates.

15. The method as defined in claim 5 further comprising a step of interposing between said supporting portion and said piezoelectric element a preload member for applying a given compression load to said piezoelectric element in a rest position of said piezoelectric element and a temperature compensating member having a characteristic of temperature-linear expansion contrary to that of said piezoelectric element.

16. The method as defined in claim 15, wherein said preload member has an inverted U-shaped configuration composed of an upper plate portion and a pair of side plate portions, and said interposing step comprises fixing said temperature compensating member to one end of said piezoelectric element, movably mounting said preload member on said supporting portion, and fixing said side plate portions of said preload member to opposite side surfaces of said supporting portion.

17. The method as defined in claim 6, wherein said meal powder is an alloy powder containing about 31 wt % or more of Ni, about 5 wt % or more of Co, and a residual quantity of Fe.

* * * * *